US012638992B2

(12) United States Patent
Pinto et al.

(10) Patent No.: US 12,638,992 B2
(45) Date of Patent: May 26, 2026

(54) SYSTEMS, METHODS, AND APPARATUS FOR MANAGING DEVICE MEMORY AND DEVICE FUNCTIONALITY AND PROGRAMS

(71) Applicant: Samsung Electronics Co., Ltd., Suwon-si (KR)

(72) Inventors: Oscar P. Pinto, San Jose, CA (US); William Martin, Roseville, CA (US)

(73) Assignee: Samsung Electronics Co., Ltd. (KR)

( * ) Notice: Subject to any disclaimer, the term of this patent is extended or adjusted under 35 U.S.C. 154(b) by 131 days.

(21) Appl. No.: 18/141,362

(22) Filed: Apr. 28, 2023

(65) Prior Publication Data

US 2023/0359376 A1 Nov. 9, 2023

Related U.S. Application Data

(60) Provisional application No. 63/339,506, filed on May 8, 2022.

(51) Int. Cl.
*G06F 3/06* (2006.01)

(52) U.S. Cl.
CPC .......... *G06F 3/0634* (2013.01); *G06F 3/0604* (2013.01); *G06F 3/0659* (2013.01); *G06F 3/0673* (2013.01)

(58) Field of Classification Search
CPC .... G06F 3/0604; G06F 3/0634; G06F 3/0659; G06F 3/0673; G06F 12/00; G06F 12/0868; G06F 12/0873; G06F 2212/601
See application file for complete search history.

(56) References Cited

U.S. PATENT DOCUMENTS

| | | | | |
|---|---|---|---|---|
| 9,817,769 | B1 * | 11/2017 | Xu | G06F 12/10 |
| 2008/0005794 | A1 * | 1/2008 | Inoue | G06F 21/56 |
| | | | | 726/22 |
| 2008/0047005 | A1 * | 2/2008 | Urata | G06F 9/526 |
| | | | | 711/E12.091 |
| 2016/0170903 | A1 * | 6/2016 | Kanno | G06F 12/0246 |
| | | | | 711/103 |
| 2019/0354302 | A1 * | 11/2019 | Enz | G06F 3/061 |
| 2020/0137565 | A1 * | 4/2020 | Guerin | H04W 12/086 |
| 2021/0132972 | A1 | 5/2021 | Gupta et al. | |
| 2021/0286608 | A1 * | 9/2021 | Narasimhan | G06F 8/654 |
| 2021/0286745 | A1 * | 9/2021 | Smith | G06F 13/404 |
| 2021/0318828 | A1 | 10/2021 | Valtonen | |

OTHER PUBLICATIONS

European Extended Search Report for Application No. 23172094.7, mailed Oct. 9, 2023.

* cited by examiner

*Primary Examiner* — Jane W Benner
(74) *Attorney, Agent, or Firm* — Renaissance IP Law Group LLP

(57) ABSTRACT

A device may include a device memory, and a device functionality circuit, wherein at least a portion of the device functionality circuit may be capable of accessing at least a portion of the device memory, and a control circuit configured to provide information, wherein the information may indicate that the at least a portion of the device functionality circuit may be capable of accessing the at least a portion of the device memory. Additionally, or alternatively, the control circuit may be configured to receive at least one request, and perform, based on the at least one request, a configuration operation, wherein the configuration operation may include configuring at least a portion of the device memory to be accessed by the at least a portion of the device functionality circuit.

20 Claims, 11 Drawing Sheets

SYSTEMS, METHODS, AND APPARATUS FOR MANAGING DEVICE MEMORY AND DEVICE FUNCTIONALITY AND PROGRAMS

REFERENCE TO RELATED APPLICATION

This application claims priority to, and the benefit of, U.S. Provisional Patent Application Ser. No. 63/339,506 filed May 8, 2022 which is incorporated by reference.

TECHNICAL FIELD

This disclosure relates generally to devices, and more specifically to systems, methods, and apparatus for managing device memory and programs.

BACKGROUND

A device such as an accelerator, a storage device, and/or the like, may perform one or more operations for another apparatus such as a host. For example, an accelerator may perform computations using data provided by a host. As another example, a storage device may store data provided by a host. A device such as an accelerator, a storage device, and/or the like, may use device memory to implement one or more operations.

The above information disclosed in this Background section is only for enhancement of understanding of the background of the inventive principles and therefore it may contain information that does not constitute prior art.

SUMMARY

A device may include a device memory, and a device functionality circuit, wherein at least a portion of the device functionality circuit may be capable of accessing at least a portion of the device memory, and a control circuit configured to provide information, wherein the information indicates that the at least a portion of the device functionality circuit may be capable of accessing the at least a portion of the device memory. The information may further indicate a characteristic of the at least a portion of the device memory. The device may further include a communication interface, wherein the control circuit may be configured to provide the information using the communication interface. The control circuit may be configured to receive a request using the communication interface, and provide the information based on the request. The portion of device memory may be a first portion of device memory, and the information may indicate that the at least a portion of the device functionality circuit may be capable of accessing a second portion of the device memory. The portion of the device functionality circuit may be a first portion of the device functionality circuit, and the information may indicate that a second portion of the device functionality circuit may be capable of accessing the at least a portion of the device memory. A first portion of the at least a portion of the device functionality circuit may be configured as a first namespace, and a second portion of the at least a portion of the device memory may be configured as a second namespace.

A device may include a device memory, and a device functionality circuit, wherein at least a portion of the device functionality circuit may be capable of accessing at least a portion of the device memory, and a control circuit configured to receive at least one request, and perform, based on the at least one request, a configuration operation, wherein the configuration operation may include configuring at least a portion of the device memory to be accessed by the at least a portion of the device functionality circuit. The configuration operation may include receiving configuration information, and providing the configuration information to a memory control apparatus associated with the at least a portion of the device functionality circuit. The configuration operation may include allocating the at least a portion of the device memory to the at least a portion of the device functionality circuit. The device may further include a communication interface, wherein the control circuit may be configured to receive the request using the communication interface. The portion of device memory may be a first portion of device memory, and the control circuit may be configured to configure, based on the at least one request, a second portion of the device memory to be accessed by the at least a portion of the device functionality circuit. The portion of the device functionality circuit may be a first portion of the device functionality circuit, and the control circuit may be configured to configure, based on the at least one request, the at least a portion of the device memory to be accessed by a second portion of the device functionality circuit. A first portion of the at least a portion of the device functionality circuit may be configured as a first namespace, and a second portion of the at least a portion of the device memory may be configured as a second namespace. The portion of the device functionality circuit may include a compute engine, and a program configured to use the compute engine.

A device may include at least one compute resource, and a control circuit configured to receive a program, associate, with a first compute namespace of the at least one compute resource, the program, and associate, with a second compute namespace of the at least one compute resource, the program. The device may further include a communication interface, wherein the control circuit may be configured to receive the program using the communication interface. The control circuit may be configured to provide, using the communication interface, information about the program. The control circuit may be configured to configure at least a first portion of the at least one compute resource as the first compute namespace, and configure at least a second portion of the at least one compute resource as the second compute namespace. The control circuit may be configured to receive a command, and receive the program based on the command.

A method may include receiving, at a device, a request for information, wherein the device includes a device memory and a device functionality circuit, and providing, based on the request, the information, wherein the information indicates that at least a portion of the device functionality circuit may be capable of accessing at least a portion of the device memory. The information may further indicate a characteristic of the at least a portion of the device memory. The device may further includes a communication interface, and the providing may be performed, at least in part, using the communication interface. The receiving may be performed, at least in part, using the communication interface. The at least a portion of device memory may include a first portion of device memory, and wherein the information may indicate that the at least a portion of the device functionality circuit may be capable of accessing a second portion of the device memory. The at least a portion of the device functionality circuit may include a first portion of the device functionality circuit, and wherein the information may indicate that a second portion of the device functionality circuit may be capable of accessing the at least a portion of the device memory. A first portion of the at least a portion of the device functionality circuit may be configured as a first namespace, and a second portion of the at least a portion of the device memory may be configured as a second namespace.

A method may include receiving, at a device, at least one request, wherein the device may include a device memory and a device functionality circuit, and performing, based on the at least one request, a configuration operation, wherein the configuration operation may include configuring at least a portion of the device memory to be accessed by the at least a portion of the device functionality circuit. The configuration operation may include receiving, at the device, configuration information, and providing the configuration information to a memory control apparatus associated with the at least a portion of the device functionality circuit. The configuration operation may include allocating the at least a portion of the device memory to the at least a portion of the device functionality circuit. The device may further include a communication interface, and the at least one request may be received, at least in part, using the communication interface. The portion of device memory may be a first portion of device memory, and the method may further include configuring, based on the at least one request, a second portion of the device memory to be accessed by the at least a portion of the device functionality circuit. The portion of the device functionality circuit may be a first portion of the device functionality circuit, and the method may further include configuring, based on the at least one request, the at least a portion of the device memory to be accessed by a second portion of the device functionality circuit. A first portion of the at least a portion of the device functionality circuit may be configured as a first namespace, and a second portion of the at least a portion of the device memory may be configured as a second namespace. The portion of the device functionality circuit may include a compute engine, and a program configured to use the compute engine.

A method may include receiving, at a device, a program, wherein the device may include at least one compute resource, associating, with a first compute namespace of the at least one compute resource, the program, and associating, with a second compute namespace of the at least one compute resource, the program. The device may further include a communication interface, and the program may be received, at least partially, using the communication interface. The method may further include providing, using the communication interface, information about the program. The method may further include configuring at least a first portion of the at least one compute resource as the first compute namespace, and configuring at least a second portion of the at least one compute resource as the second compute namespace. The method may further include receiving, at the device, a command, and the receiving the program may be based on the command.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
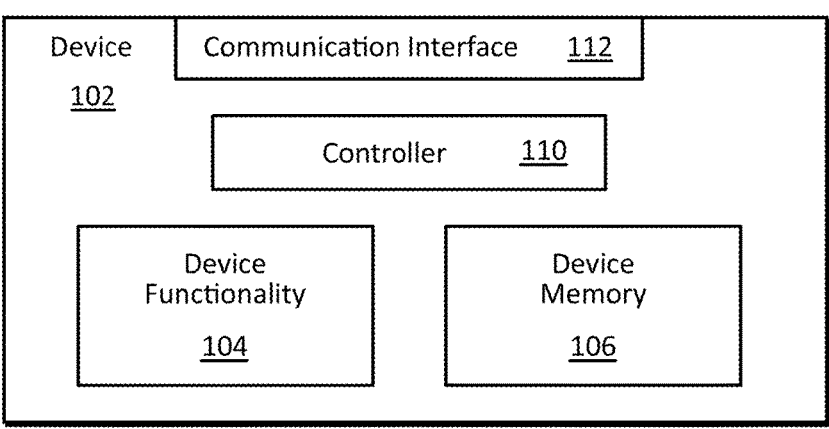
FIG. 1 illustrates an embodiment of a device having device memory in accordance with example embodiments of the disclosure.

A device such as an accelerator, a storage device, and/or the like, may use device memory to perform one or more operations. For example, an accelerator may use device memory to store input and/or output data for computations.

As another example, a storage device may use device memory as a cache for data that may be stored in a storage medium.

Some of the inventive principles of this disclosure relate to management of device memory. For example, a device may implement a discovery mechanism that may enable the device to provide information (e.g., to an apparatus such as a host) about device memory. Additionally, or alternatively, a device may implement a management mechanism that may enable device memory to be managed (e.g., by an apparatus such as a host) based on memory information provided by the device, for example, using a discovery mechanism.

In some embodiments, a discovery mechanism may implement one or more requests to provide information about device memory. For example, a device may receive a request (e.g., a discover command from an apparatus such as a host) requesting information about device memory. The device may respond to the request by returning a list of device memory resources, a log page that may include information about device memory resources, and/or the like. The information may include one or more indications of one or more portions of device functionality that may be capable of accessing one or more portions of device memory. Additionally, or alternatively, the information may include indications of one or more characteristics (e.g., type, amount, arrangement, access characteristics, performance characteristics, and/or the like) of one or more portions of device memory.

In some embodiments, device memory may be managed by configuring one or more portions of device memory to be accessed by one or more portions of device functionality. For example, in a device having compute resources, a management mechanism may enable a host to configure one or more first portions of device memory to be accessed by a first compute resource and one or more second portions of device memory to be accessed by a second compute resource.

In some embodiments, access to one or more portions of device memory may be subject to various restrictions, permissions, physical and/or logical connections, locality, and/or the like. For example, some device memory may be integral with, and only accessible by, a specific compute resource (e.g., a field programmable gate array (FPGA), an application specific circuit (ASIC), and/or the like), whereas some device memory may be more widely accessible (e.g., to any one or more portions of device functionality).

In some embodiments, one or more portions of device resources may be configured using one or more namespaces. For example, one or more portions of device memory resources, device compute resources, and/or device storage resources may be configured as one or more memory namespaces, compute namespaces, and/or storage namespaces, respectively.

Some of the inventive principles of this disclosure relate to receiving, at a computational device, a computational device program that may be accessed by multiple compute resources. For example, a computational device program may be downloaded (e.g., from an apparatus such as a host) to a computational device. The downloaded computational device program may be stored, for example, in a repository (e.g., a repository that may be at least partially public, global, and/or the like) that may be accessible by one or more first compute resources configured as a first compute namespace and one or more second compute resources configured as a second compute namespace.

In some embodiments, a device may enable a computational device program to be downloaded, discovered, activated, and/or the like, (e.g., by an apparatus such as a host) using a command mechanism. In some embodiments, a device may enable the visibility and/or accessibility of a downloaded computational device program to be configured. For example, an apparatus such as a host may configure a downloaded computational device program to appear as a native computational program (e.g., having at least partially public, global, and/or the like, accessibility). Additionally, or alternatively, a downloaded computational device program may be configured to have restricted access (e.g., by one or more specific compute resources).

This disclosure encompasses numerous inventive principles relating to management of device memory and/or programs. The principles disclosed herein may have independent utility and may be embodied individually, and not every embodiment may utilize every principle. Moreover, the principles may also be embodied in various combinations, some of which may amplify some benefits of the individual principles in a synergistic manner.

For purposes of illustration, some embodiments may be described in the context of computational devices (e.g., computational storage devices) and/or compute resources. However, the principles may be applied to any devices and/or device functionalities that may utilize device memory and/or programs received at a device.

FIG. 1 illustrates an embodiment of a device having device memory in accordance with example embodiments of the disclosure. The device 102 illustrated in FIG. 1 may include device functionality apparatus 104 (which may also be referred to as device functionality, device functionality resources, or functionality resources), device memory 106 (which may also be referred to as device memory resources or memory resources), one or more controllers 110 (which may be referred to individually and/or collectively as a controller) and/or one or more communication interfaces 112 (which may be referred to individually and/or collectively as a communication interface).

The device functionality 104 may include any type of resources (e.g., hardware and/or software) that may enable the device 102 to perform one or more functions (e.g., a primary function) of the device. For example, if the device 102 is implemented at least partially as a storage device, the device functionality 104 may include any type of nonvolatile storage media, a media translation layer, one or more channel controllers, and/or the like. Examples of storage media may include solid state media, magnetic media, optical media, and/or the like, or a combination thereof. For example, a storage device may be implemented as an SSD having not-AND (NAND) flash memory and a media translation layer implemented as a flash translation layer (FTL). Other examples of solid state media may include persistent memory such as cross-gridded nonvolatile memory, memory with bulk resistance change, phase change memory (PCM), and/or the like, or any combination thereof.

As another example, if the device 102 is implemented at least partially as a computational device (e.g., an accelerator, a computational storage device, and/or the like), the device functionality 104 may include any type of hardware and/or software compute resources such as one or more compute engines, one or more programs, and/or the like.

Examples of compute engines may include complex programmable logic devices (CPLDs), field programmable gate arrays (FPGAs), application specific integrated circuits (ASICs), central processing units (CPUs) including complex instruction set computer (CISC) processors such as x86 processors and/or reduced instruction set computer (RISC) processors such as ARM processors, graphics processing units (GPUs), data processing units (DPUs), neural processing units (NPUs), tensor processing units (TPUs), and/or the like, that may execute instructions stored in any type of memory and/or implement any type of execution environment such as a container, a virtual machine, an operating system such as Linux, an Extended Berkeley Packet Filter (eBPF) environment, and/or the like, or a combination thereof. In some embodiments, a compute engine may include combinational logic, sequential logic, one or more timers, counters, registers, and/or state machines, and/or the like. In some embodiments, some or all of a compute resource may be implemented as a system-on-chip (SOC).

Examples of programs may include any type of instructions that may be executed by one or more compute resources such as an algorithm, data movement, data management, data selection, filtering, encryption and/or decryption, compression and/or decompression, encoding and/or decoding (e.g., erasure coding), checksum calculation, hash value calculation, cyclic redundancy check (CRC), and/or the like. In some embodiments, programs may perform operations using data stored in device memory 106, data streamed to the program, and/or the like.

As a further example, if the device 102 is implemented at least partially as a communication device such as a network interface card (NIC), a wireless access point (AP), a wireless station (STA), a wireless base station, a wireless user equipment (UE), and or the like, the device functionality 104 may include one or more components to receive and/or transmit wired and/or wireless (e.g., RF) signals such as amplifiers, filters, modulators and/or demodulators, A/D and/or DA converters, antennas, switches, phase shifters, detectors, couplers, conductors, transmission lines, modems, network interfaces, physical layers (PHYs), medium access control layers (MACs), and/or the like.

The device memory 106 may include one or more volatile and/or non-volatile (e.g., persistent) memory resources that may have a wide variety of characteristics such as memory type, bandwidth, capacity, latency, access granularity, write endurance, power consumption, and/or the like. Examples of volatile memory may include dynamic random access memory (DRAM), static random access memory (SRAM), and/or the like. Examples of non-volatile memory may include NAND flash memory, cross-gridded nonvolatile memory, memory with bulk resistance change, PCM, magnetoresistive random-access memory (MRAM), resistive random-access memory (ReRAM), and/or the like.

In some embodiments, one or more portions of device memory may be configured as one or more memory namespaces. In some embodiments, a memory namespace may refer to a collection of one or more addresses, ranges of addresses, and/or the like, of memory cells, lines, columns, bytes, words, pages, blocks, and/or the like.

In some embodiments, access to one or more portions of device memory may be subject to various restrictions, permissions, physical and/or logical connections, locality, and/or the like. For example, some device memory may be integral with, and only accessible by, a specific compute resource (e.g., an FPGA, an ASIC, and/or the like), whereas some device memory may be more widely accessible (e.g., to any one or more portions of device functionality).

The device memory 106 may be implemented in any physical arrangement including single inline memory modules (SIMMs), dual inline memory modules (DIMMs), individual memory devices (e.g., integrated circuits (ICs)), stacks of memory devices, embedded in one or more other components such as FPGA, ASICs, and/or the like. The device memory 106 may be located in, on, at, and/or near the device 102. For example, one or more portions of the device memory 106 may be attached to (e.g., soldered, connected using a connector, and/or the like) to a circuit board that may be used to implement the device 102, attached to the device 102, and/or located adjacent to or near the device 102 in a manner that my enable control and/or access by the device 102, for example, in a memory buffer, cache, and/or the like, that may be accessible to the device 102 using an interface and/or protocol (e.g., a coherent interface and/or protocol) such as CXL.cache, CXL.io, CXL.mem, and/or the like.

Although the device functionality 104 and device memory 106 may be illustrated as separate components, in some embodiments, one or more portions of the device functionality 104 and one or more portions of the device memory 106 may overlap. For example, one or more portions of the device memory 106 may be located at least partially within one or more portions of the device functionality 104 (e.g., an FPGA or ASIC may include local DRAM). Similarly, just as some local memory may be located within (and possibly only accessible by) a compute engine, one or more computational resources 104 may be located within one or more portions of device memory 106. For example, in some embodiments, a memory device or a stack of memory devices may include processing in memory (PIM) hardware that may be located within (and may possibly only be able to access) the memory device or stack of memory devices.

The controller 110 may include any type of resources (e.g., hardware and/or software) that may control one or more operations of one or more portions of the device 102. For example, the controller 110 may include one or more processors, state machines, combinational logic, sequential logic, CPLDs, FPGAs, ASICs, dedicated logic, and/or the like. In some embodiments, if the device 102 is implemented at least partially as a storage device, the one or more controllers 110 may include one or more FTLs, channel controllers, Nonvolatile Memory Express (NVMe) controllers, Peripheral Component Interconnect Express (PCIe) controllers, Compute Express Link (CXL) controllers, and/or the like, or a combination thereof. In some embodiments, if the device 102 is implemented at least partially as a communication device, the one or more controllers 110 may include one or more MAC controllers.

The communication interface 112 may be implemented with any type of wired and/or wireless communication medium, interface, network, interconnect, protocol, and/or the like including PCIe, NVMe, NVMe over Fabric (NVMe-oF), CXL, and/or a coherent protocol such as CXL.mem, CXL.cache, CXL.O and/or the like, Gen-Z, Open Coherent Accelerator Processor Interface (OpenCAPI), Cache Coherent Interconnect for Accelerators (CCIX), and/or the like, Advanced eXtensible Interface (AXI), Direct Memory Access (DMA), Remote DMA (RDMA), RDMA over Converged Ethernet (ROCE), Advanced Message Queuing Protocol (AMQP), Ethernet, Transmission Control Protocol/Internet Protocol (TCP/IP), FibreChannel, InfiniBand, Serial ATA (SATA), Small Computer Systems Interface (SCSI), Serial Attached SCSI (SAS), iWARP, any generation of wireless network including 2G, 3G, 4G, 5G, 6G, and/or the like, any generation of Wi-Fi, Bluetooth, near-field communication (NFC), and/or the like, or any combination thereof.

The device 102 may be implemented with any physical form factor. Examples of form factors may include a 3.5 inch storage device form factor, 2.5 inch storage device form factor, 1.8 inch storage device form factor, M.2 device form factor, Enterprise and Data Center Standard Form Factor (EDSFF) (which may include, for example, E1.S, E1.L, E3.S, E3.L, E3.S 2T, E3.L 2T, and/or the like), add-in card (AIC) (e.g., a PCIe card (e.g. PCIe expansion card) form factor including half-height (HH), half-length (HL), half-height, half-length (HHHL), and/or the like), Next-generation Small Form Factor (NGSFF), NF1 form factor, compact flash (CF) form factor, secure digital (SD) card form factor, Personal Computer Memory Card International Association (PCMCIA) device form factor, and/or the like, or a combination thereof.

In some embodiments, any of the devices disclosed herein may be connected to a system using one or more connectors such as SATA connectors, SCSI connectors, SAS connectors, M.2 connectors, EDSFF connectors (e.g., 1C, 2C, 4C, 4C+, and/or the like), U.2 connectors (which may also be referred to as SSD form factor (SSF) SFF-8639 connectors), U.3 connectors, PCIe connectors (e.g., card edge connectors), and/or the like.

In some embodiments, any of the devices disclosed herein may be implemented entirely or partially with, and/or used in connection with, a server chassis, server rack, dataroom, datacenter, edge datacenter, mobile edge datacenter, and/or any combinations thereof.

Figure 2:
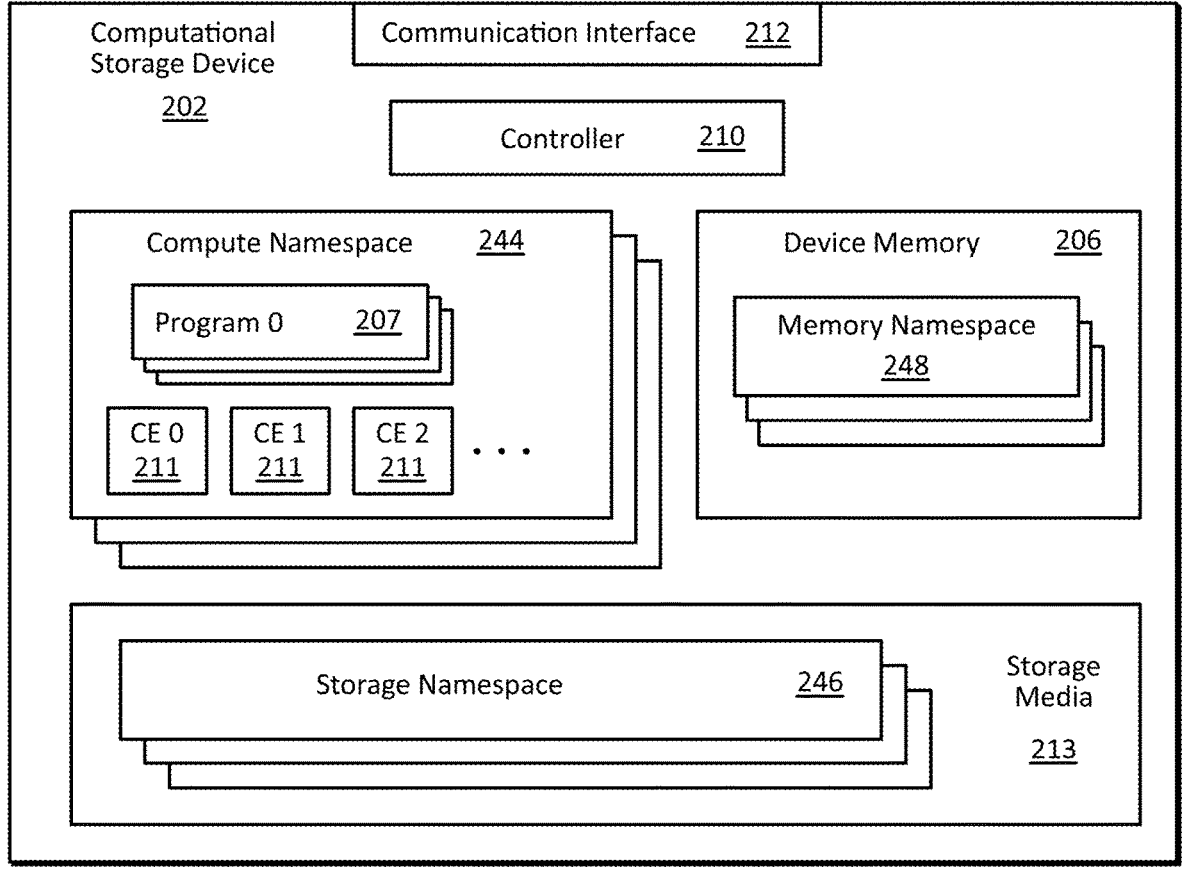
FIG. 2 illustrates an embodiment of a computational storage device having namespaces in accordance with example embodiments of the disclosure.

FIG. 2 illustrates an embodiment of a computational storage device having namespaces in accordance with example embodiments of the disclosure. The device 202 illustrated in FIG. 2 may be used, for example, to implement the device 102 illustrated in FIG. 1. The device 202 may include some elements similar to those illustrated in FIG. 1 in which similar elements may have reference numbers ending in similar digits. However, in the device 202 illustrated in FIG. 2, one or more portions of device functionality may be implemented as compute engines 211 and/or programs 207, and one or more portions of device functionality may be implemented as storage media 213.

In the device 202 illustrated in FIG. 2, one or more portions of device resources may be configured as one or more namespaces. For example, one or more portions of device memory resources, device compute resources, and/or device storage resources may be configured as one or more memory namespaces, compute namespaces, and/or storage namespaces, respectively.

In some embodiments, a namespace may refer to a collection of one or more resources. In some embodiments, a collection of one or more resources configured as a namespace may be isolated, at least partially, from other collections of resources configured as other namespaces. In some embodiments, namespaces may provide logical and/or physical isolation between namespaces and/or the resources that may be configured as a namespace. In some embodiments, a namespace may indicate a collection of one or more resources that may be accessible as a unit, for example, by an apparatus such as a host.

In some embodiments, a namespace may be configured, handled, and/or the like, as a virtual construct (e.g., a virtual namespace). Depending on the implementation details, this may enable a namespace (e.g., a compute namespace) to be mapped (e.g., directly) into a virtual environment such as a virtual machine (VM). In some embodiments, a virtual machine may control loading (e.g., downloading) of a program into a compute namespace associated with the virtual machine. This may be in contrast to using a central entity such as a hypervisor to load a program. Depending on the implementation details, enabling a virtual machine may control loading a program may provide flexibility, for example, to remove a loaded program (e.g., when the virtual machine terminates shuts down).

In the context of storage resources, a namespace may refer to a collection of one or more logical block addresses (LBAs). The LBAs may map to one or more physical block addresses (PBAs) that may be located at different physical locations such as cylinders, tracks, channels, pages, and/or the like. Depending on the implementation details, a namespace may appear (e.g. to an apparatus such as a host) as a separate storage device. In the device 202 illustrated in FIG. 2, one or more portions of storage media 213 may be configured as one or more storage namespaces 246.

In the context of compute resources, a compute namespace may refer to a collection of one or more compute engines, programs, and/or the like, for example, as described above with respect to FIG. 1. In the device 202 illustrated in FIG. 2, one or more compute resources such as compute engines 211 and/or programs 207 may be configured as one or more compute namespaces 244.

In the context of memory resources, a memory namespace may refer to a collection of one or more memories and/or portions thereof, for example, as described above with respect to FIG. 1. For example, memory namespace be configured as a collection of one or more addresses, ranges of addresses, and/or the like, of memory cells, lines, columns, bytes, words, pages, blocks, and/or the like. In the device 202 illustrated in FIG. 2, one or more portions of device memory 206 may be configured as one or more memory namespaces 248.

Referring again to FIG. 1, in some embodiments, one or more of the portions of the device memory 106 may be used by one or more portions of the device functionality 104. For example, in an embodiment in which the device 102 is implemented as a computational storage device, the device functionality 104 may include compute resources (e.g., one or more compute engines and/or computational programs) and storage resources (e.g., a storage medium). In such an embodiment, one or more portions of the device memory 106 may be used, for example, for any number of the following operations: storing input data copied from a host, a storage medium (e.g., one or more portions of a storage medium configured as a storage namespace), and/or the like; buffering and/or output data for a program running on a compute engine; buffering intermediate data used by a program running on a compute engine; copying output data to host memory, a storage medium (e.g., one or more portions of a storage medium configured as a storage namespace), and/or the like; exchanging data between programs; exchanging data between virtual machines (e.g., running on one or more compute resources); and/or the like.

Some of the inventive principles of this disclosure relate to mechanisms (which may also be referred to as schemes) that may be used to obtain information about, and/or manage, device memory 106. For example, in some embodiments, a device 102 may implement a discovery mechanism that may enable a host to obtain information about one or more portions of device memory 106 that may be located in, on, at, and/or near the device 102. Additionally, or alternatively, the device 102 may implement a management mechanism that may enable the host may use the information about the device memory (e.g., obtained using the discovery mechanism) to manage one or more portions of the device memory 106. In some embodiments, one or more portions of the device memory 106 may be managed by configuring the one or more portions of device memory 106 to access one or more portions of device functionality 104. For example, in a device 102 in which at least a portion of the device functionality 104 is implemented with compute resources, a management mechanism may enable a host to configure one or more first portions of device memory 106 to access a first compute resource and one or more second portions of device memory 106 to access a second compute resource.

In some embodiments, a host may be implemented with any component or combination of components that may utilize one or more of the device functionality 104, device memory 106, discovery mechanism, and/or management mechanism of a device 102. For example, a host may include to one or more of a client device, a server, a storage node, a CPU, a personal computer, a tablet computer, a smartphone, and/or the like.

For purposes of illustration, some example embodiments may be described in the context of systems in which a host may use a discovery and/or management scheme to obtain information about, and/or manage, device memory. However, the principles are not limited to use by a host as described above. For example, any of the schemes for obtaining information about, and/or managing, device memory may be used, at least partially, by the device itself, by another device, and/or any other entities that may include hardware, software, processes, services, and/or the like. Thus, in some embodiments, and depending on the context and/or implementation details, a host may refer to any entity, including a portion of a device itself and/or another device, that may use a discovery scheme and/or a management scheme to obtain information about, and/or manage, device memory in accordance with the disclosure.

Figure 3:
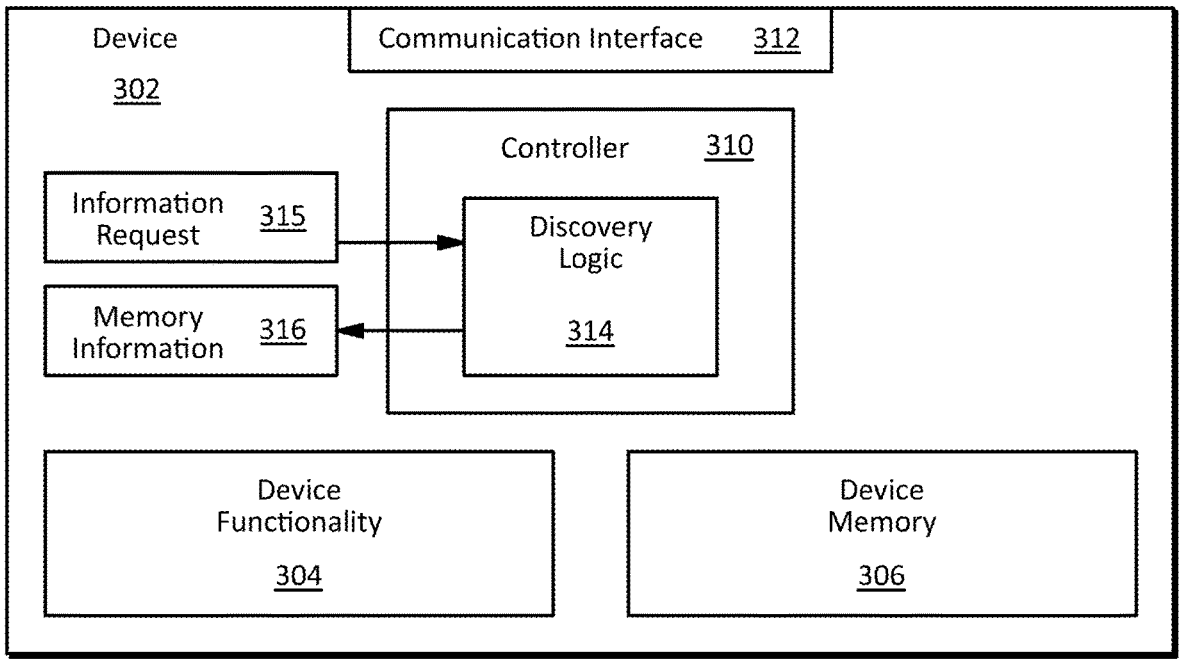
FIG. 3 illustrates an embodiment of a device including a discovery mechanism in accordance with example embodiments of the disclosure.

FIG. 3 illustrates an embodiment of a device including a discovery mechanism in accordance with example embodiments of the disclosure. The device 302 may include some elements similar to those illustrated in FIG. 1 and/or FIG. 2 in which similar elements may have reference numbers ending in similar digits. However, in the embodiment illustrated in FIG. 3, the controller 310 may include discovery logic 314 that may implement a discovery mechanism to enable the device 302 to provide information (which may be referred to as memory information) 316 about device memory 306 (e.g., to an apparatus such as a host).

The memory information 316 may include indications of one or more characteristics (e.g., type, amount, arrangement, access characteristics, performance characteristics, and/or the like) of one or more portions of device memory. For example, the device memory 306 may include one or more types of volatile memory (e.g., DRAM, SRAM, and/or the like) and/or non-volatile (e.g., persistent) memory resources (e.g., flash memory, PCM, and/or the like). Various portions of the device memory 306 may have different bandwidth (e.g., read and/or write bandwidth), capacity (e.g., size in terms of bytes such as Kilobytes (KB), Megabytes (MB), Gigabytes (GB), etc.), latency, access granularity (e.g., persistent memory may be byte accessible, whereas flash memory may be written and/or read in pages but erased in blocks), namespace configuration (e.g., one or more portions of any memory resource may be configured as one or more namespaces, address ranges within a namespace, and/or the like), write endurance, power consumption, and/or the like. In some embodiments, the memory information 316 may include one or more indications of any of these or other characteristics of one or more portions of device memory 306.

Additionally, or alternatively, the memory information 316 may include one or more indications of one or more portions of device functionality that may be capable of accessing one or more portions of device memory. For example, one or more portions of the device functionality 304 and one or more portions of the device memory 306 may be connected through one or more connections (e.g., a structure or arrangement of connections). Some of the connections may only enable restricted access (e.g., local or private access) to one or more portions of the device memory 306, whereas some of the connections may enable one or more portions of the device memory 306 to be accessed in an unrestricted or less restricted manner (e.g., global or public access) by one or more portions of the device functionality 304. For example, an FPGA may include local (e.g., internal) memory and an arrangement of connections that may only allow the local memory to be accessed by compute resources within the FPGA. Similarly, a compute engine (e.g., a CPU circuit such as an ARM circuit) may include local memory and an arrangement of connections that may only allow the local memory to be accessed by the CPU. In some embodiments, the memory information 316 may include one or more indications of any of these or other characteristics, connections, restrictions, arrangements, and/or the like, of the device functionality 304 and/or device memory 306.

In some embodiments, a discovery mechanism may implement one or more memory information requests (e.g., commands) 315 to provide information about device memory 306. For example, a device may receive a discover command (e.g., from an apparatus such as a host) requesting information about device memory 306. The device 302 may respond to a discover command by returning a data structure (e.g., a list, a table, and/or the like), a pointer to a data structure, a log page, and/or the like, that may include information about device memory resources 306. As another example, the device 302 may implement a command line interface (CLI) that may enable a device to provide memory information (e.g., to an apparatus such as a host).

Figure 4:
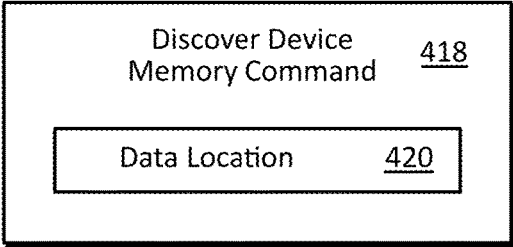
FIG. 4 illustrates an example embodiment of a discover device memory command in accordance with example embodiments of the disclosure.

FIG. 4 illustrates an example embodiment of a discover device memory command in accordance with example embodiments of the disclosure. The discover device memory command 418 illustrated in FIG. 4 may be used, for example, to implement the memory information request 315 illustrated in FIG. 3. The discover device memory command 418 may be sent, for example, to the controller 310 of device 302 (e.g., by a host) to cause the controller 310 to provide memory information 316 (e.g., to the host). In some embodiments, the controller 310 may send, in response to the discover device memory command 418, a response that may include the requested memory information 316 (e.g., a data structure including the requested memory information 316 embedded in the response). Alternatively, or additionally, the discover device memory command 418 illustrated in FIG. 4 may include a data location 420 that may indicate (e.g., by a pointer) a location (e.g., a buffer location) in which the controller 310 may write the requested memory information 316. In some embodiments, the discover device memory command 418 may be implemented, for example, as an NVMe command, a CXL command, and/or the like.

Table 1 illustrates an example embodiment of a data structure that may be used to provide information about device memory in accordance with example embodiments of the disclosure. The embodiment illustrated in Table 1 may be used, for example, to provide device memory information 316 in response to the discover device memory command 418 illustrated in FIG. 4, and in the context of the device 302 illustrated in FIG. 3. In the embodiment illustrated in Table 1, one or more portions of device functionality 304 may be implemented as compute engines (CEs) as shown in column 2, but the principles may be applied to any other type of device functionality.

Referring to Table 1, a row may correspond to one or more portions of device memory 306. The columns within a row may provide the following information: column 1 may indicate a memory identifier (Memory ID or Mem ID) for a portion of device memory 306 (e.g., a memory device); column 2 may indicate identifiers for one or more portions of device functionality 304 (in this example, a compute engine identifier (Compute Engine ID or CEID) that may be capable of accessing the portion of device memory 306 identified by Mem ID; column 3 may indicate one or more characteristics of the portion of device memory 306 indicated by Mem ID (in this example, a memory type (e.g., DRAM or persistent), a latency, a bandwidth, and/or a power characteristic); columns 4 and 5 may include one or more sub-rows that may include a Namespace identifier (Namespace ID or NSID) and/or a range identifier (Range ID or RID) indicating one or more namespaces and/or ranges of memory that may be configured as a corresponding namespace; column 6 may indicate a range of memory addresses associated with a corresponding Namespace ID and/or Range ID; and column 7 may indicate whether the corresponding range of memory addresses has been allocated (e.g., to a compute engine, program, and/or the like).

host) based on memory information provided by the device, for example, using a discovery mechanism.

The management logic 518 may manage device memory 506, for example, by configuring one or more portions of device memory 506 to be accessed by one or more portions of device functionality 504.

In some embodiments, the management logic 518 may configure one or more portions of device memory 506 by receiving configuration information 523 (e.g., from an apparatus such as a host) and providing the configuration information 523 to a memory control apparatus associated with the one or more portions of device functionality 504 that may implement the configuration information. For example, in some embodiments, an apparatus such as a host may allocate one or more portions of device memory 506 to one or more portions of device functionality 504. Thus, the configuration information 523 may include a list, table, or other data structure indicating one or more portions of device functionality 504 and one or more corresponding portions of device memory 506 that may be configured to be

TABLE 1

| 1 Mem ID | 2 Accessible by Compute Engine ID | 3 Characteristics | 4 Namespace ID | 5 Range ID | 6 Range | 7 Allocated |
|---|---|---|---|---|---|---|
| MEM A | CE1, CE2 | DRAM, CAS14, 3200 MHz | NS100 | Range 1 | 0000-0999 | |
| | | | | Range 2 | 1000-1999 | |
| | | | NS101 | Range 1 | 2000-2999 | Yes |
| | | | | Range 2 | 3000-3999 | Yes |
| | | | NS102 | Range 1 | 4000-4999 | |
| | | | | Range 2 | 5000-5999 | |
| MEM B | CE1, CE2, CE3 | DRAM, CAS16, 3200 MHz, low power (LPDDR4) | NS200 | Range 1 | 0000-0999 | Yes |
| | | | | Range 2 | 1000-1999 | Yes |
| | | | NS201 | Range 1 | 2000-2999 | |
| | | | | Range 2 | 3000-3999 | |
| | | | NS202 | Range 1 | 4000-4999 | |
| | | | | Range 2 | 5000-5999 | |
| MEM C | CE1, CE2, CE3 | Persistent, 8 μs | NS300 | Range 1 | 0000-0999 | |
| | | | | Range 2 | 1000-1999 | |
| | | | NS301 | Range 1 | 2000-2999 | |
| | | | | Range 2 | 3000-3999 | |
| | | | NS302 | Range 1 | 4000-4999 | Yes |
| | | | | Range 2 | 5000-5999 | Yes |

As mentioned above, for purposes of illustration, in the embodiment illustrated in Table 1, one or more portions of device functionality 304 may be implemented as compute engines as shown in column 2, but the principles may be applied to any other type of device functionality. For example, in other embodiments, column 2 may indicate an identifier of one or more portions of device functionality 304 as a device functionality identifier (Device Functionality ID or DFID). For purposes of illustration, the embodiment illustrated in Table 1 may provide an example of information about device memory corresponding to the embodiment illustrated in FIG. 9, but the principles are not limited these or any other implementation details.

Figure 5:
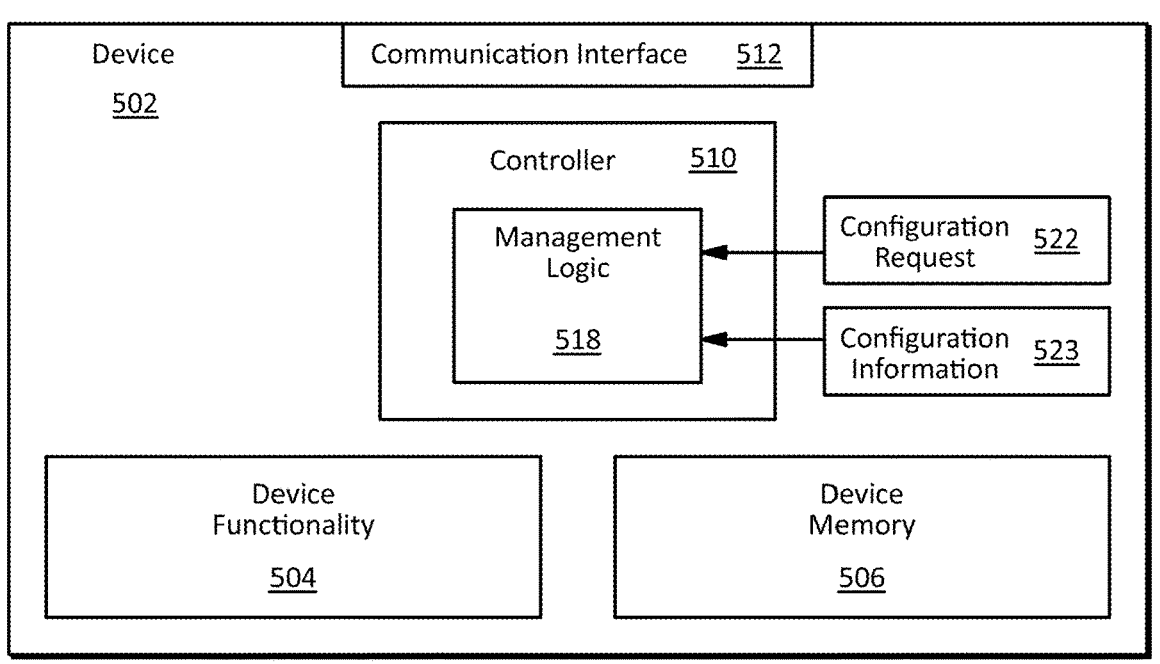
FIG. 5 illustrates an embodiment of a device including a management mechanism in accordance with example embodiments of the disclosure.

FIG. 5 illustrates an embodiment of a device including a management mechanism in accordance with example embodiments of the disclosure. The device 502 illustrated in FIG. 5 may include some elements similar to those illustrated in FIG. 1, FIG. 2, and/or FIG. 3 in which similar elements may have reference numbers ending in similar digits. However, in the embodiment illustrated in FIG. 5, the controller 510 may include management logic 518 that may implement a management mechanism to enable the device memory 506 to be managed (e.g., by an apparatus such as a accessed by the one or more portions of device functionality 504. Examples of memory control apparatus associated with the one or more portions of device functionality 504 may include a memory controller in a processor (e.g., a CPU), a memory configuration register in an FPGA or an ASIC, and/or the like.

Additionally, or alternatively, the management logic 518 may configure one or more portions of device memory 506 by allocating one or more portions of device memory 506 to one or more portions of device functionality 504. In such an embodiment, the configuration information 523 may include one or more specifications, requirements, and/or the like, for one or more portions of device functionality 504 to enable the management logic 518 to allocate one or more appropriate portions of device memory 506 to the one or more portions of device functionality 504, for example, based on one or more types, amounts, access granularities, performance characteristics, and/or the like, of memory.

In some embodiments, the management logic 518 may configure device memory 506 in response to a configuration request 522. In some embodiments, a configuration request 522 may be implemented, for example, with a command that may be received by the management logic 518 (e.g., from an apparatus such as a host). Additionally, or alternatively, a device 502 may implement management logic 518 and/or a configuration request 522, at least in part, with a command line interface (CLI).

In some embodiments, one or more portions of the device functionality 504 and one or more portions of the device memory 506 may be connected using one or more connections (e.g., a structure or arrangement of connections) that may affect the ability of one or more portions of the device functionality 504 to access one or more portions of the device memory 506. For example, as described above, some portions of device memory 506 may be located in, and only accessible by, certain portions of device functionality 504 (e.g., local memory in an FPGA, an ASIC, and/or the like), whereas other portions of device memory 506 may have less restrictive access (e.g., global memory may be publicly accessible). Thus, a host or other apparatus may use memory information (e.g., memory information 316 illustrated in FIG. 3 and/or memory information in Table 1) to determine which portions of device memory 506 may be configured to be accessed by which portions of device functionality 504.

Figure 6:
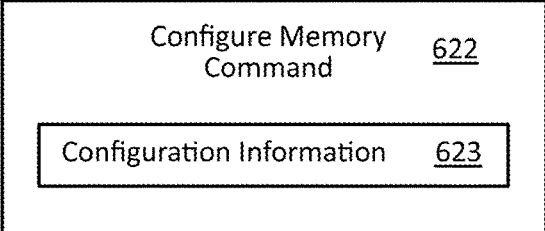
FIG. 6 illustrates a first example embodiment of a configure memory command in accordance with example embodiments of the disclosure.

FIG. 6 illustrates a first example embodiment of a configure memory command in accordance with example embodiments of the disclosure. The configure memory command 622 illustrated in FIG. 6 may be used, for example, to implement the configuration request 522 illustrated in FIG. 5. The configure memory command 622 illustrated in FIG. 6 may be sent, for example, to the controller 510 of device 502 (e.g., by a host) to cause the management logic 518 to configure one or more portions of device memory 506 to be accessed by one or more portions of device functionality 504. For purposes of illustration, the configure memory command 622 illustrated in FIG. 6 may be described in the context of one or more portions of device functionality 504 that may be implemented with compute engines, but the principles may be applied to any other type of device functionality. In some embodiments, the configure memory command 622 may be implemented, for example, with an NVMe command, a CXL command, and/or the like.

The configure memory command 622 may include configuration information 623 that may enable the management logic 518 to configure one or more portions of device memory 506 to be accessed by one or more portions of device functionality 504. (In some embodiments, the configuration information 623 may be implemented with a pointer or other reference scheme to access the configuration information.) For example, in some embodiments, the configuration information 623 may include a list, table, or other data structure (or a pointer to a data structure) that may include one or more indications of one or more portions of device memory 506 that the management logic 518 may configure to be accessed by one or more portions of device functionality 504 (e.g., based on one or more memory allocations determined by an apparatus such as a host). As another example, in some embodiments, the configuration information 623 may include one or more specifications, requirements, and/or the like, for one or more portions of device functionality 504 to enable the management logic 518 to allocate one or more appropriate portions of device memory 506 to the one or more portions of device functionality 504, for example, based on one or more types, amounts, access granularities, performance characteristics, and/or the like, of memory.

Table 2 illustrates an example embodiment of a data structure that may be used to send configuration information 623 (e.g., from an apparatus such as a host) to management logic 518 of a device 502. In some embodiments, Table 2 may be received by management logic 518 and used to configure one or more portions of device memory 506 to be accessed by one or more portions of device functionality 504. For example, Table 2 may be embedded within a configure memory command 622, referenced by a pointer within a configure memory command 622, or communicated in any other manner in conjunction with the configure memory command 622. In the embodiment illustrated in Table 2, one or more portions of device functionality 504 may be implemented with compute engines as shown in column 1, but the principles may be applied to any other type of device functionality. The embodiment illustrated in Table 2 may use identifiers (e.g., Compute Engine ID, Mem ID, Namespace ID, and/or the like) similar to those used in Table 1.

Referring to Table 2, column 1 may indicate a compute engine. Column 2 may indicate a program that may be instantiated, activated, and/or the like, to run on a corresponding compute engine. Columns 3, 4, and 5 may indicate a memory (e.g., memory device), namespace, and/or address range, respectively, that may be configured to be accessed by the corresponding compute engine and/or program.

TABLE 2

| 1 Compute Engine ID | 2 Program ID | 3 Mem ID | 4 Namespace ID | 5 Range ID |
| --- | --- | --- | --- | --- |
| CE1 | P1 | MEM A | NS101 | Range 1 |
| | | | | Range 2 |
| | | MEM B | NS200 | Range 1 |
| | | | | Range 2 |
| | | MEM C | NS302 | Range 1 |
| | | | | Range 2 |
| | P2 | MEM A | NS100 | Range 1 |
| | | MEM B | NS201 | Range 1 |
| | | | | Range 2 |
| | | MEM C | NS301 | Range 2 |
| CE2 | P4 | MEM A | NS102 | Range 1 |
| | | MEM B | | |
| | | MEM C | | |
| | P5 | MEM A | NS102 | Range 2 |
| | | MEM B | | |
| | | MEM C | | |
| CE3 | P8 | MEM B | NS202 | Range 1 |
| | | | | Range 2 |
| | | MEM C | | |
| | P9 | MEM B | | |
| | | MEM C | NS300 | Range 1 |
| | | | | Range 2 |

Figure 8:
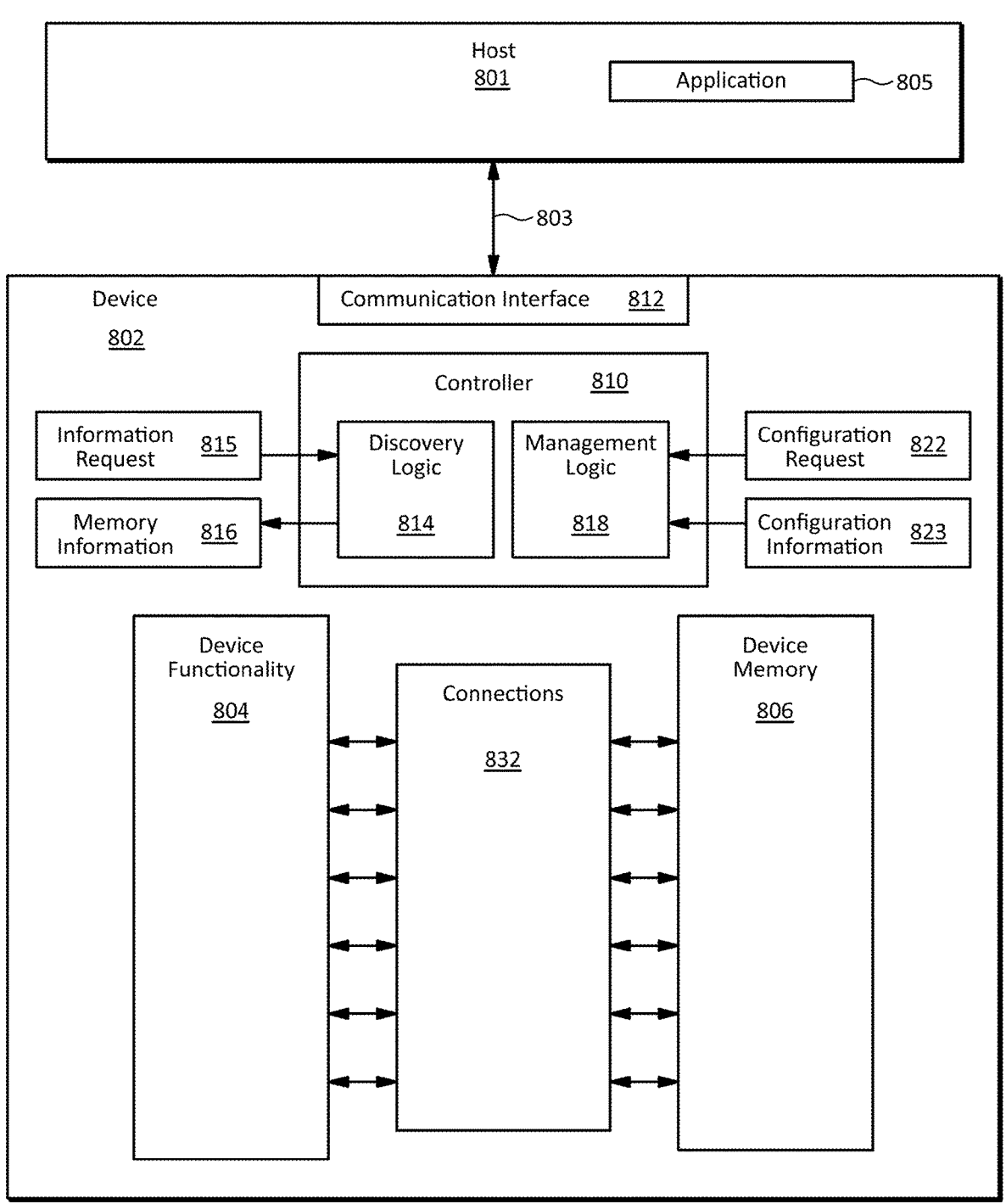
FIG. 8 illustrates an embodiment of a device including a discovery mechanism and a management mechanism in accordance with example embodiments of the disclosure.

For purposes of illustration, the embodiment illustrated in Table 2 may provide an example of configuration information that may be used with the embodiment illustrated in FIG. 8. For example, column 3 may not include entries for Mem A for CE3 because Mem A may not be accessible by CE3 in the embodiment illustrated in FIG. 9. However, the principles are not limited these or any other implementation details.

Figure 7:
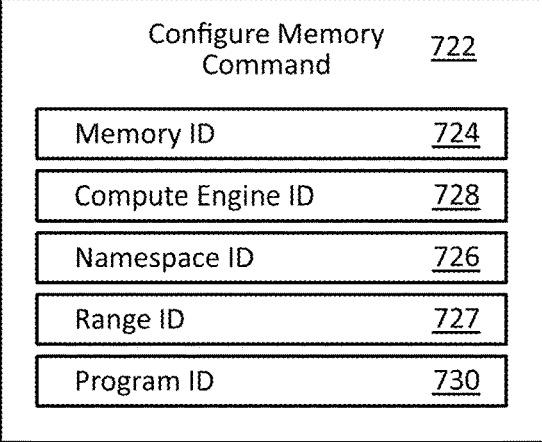
FIG. 7 illustrates a second example embodiment of a configure memory command in accordance with example embodiments of the disclosure.

FIG. 7 illustrates a second example embodiment of a configure memory command in accordance with example embodiments of the disclosure. The configure memory command 722 illustrated in FIG. 7 may be used, for example, to implement the configuration request 522 illustrated in FIG. 5. The configure memory command 722 illustrated in FIG. 7 may be sent, for example, to the controller 510 of device 502 (e.g., by a host) to cause the management logic 518 to configure one or more portions of device memory 506 to be accessed by one or more portions of device functionality 504. For purposes of illustration, the configure memory command 722 illustrated in FIG. 7 may be described in the context of one or more portions of device functionality 504 that may be implemented with compute engines, but the principles may be applied to any other type of device functionality. In some embodiments, the configure memory command 722 may be implemented, for example, with an NVMe command, a CXL command, and/or the like.

The configure memory command 722 may include a memory ID (Mem ID) 724 to indicate a portion of device memory 506 to configure, and a compute engine identifier (Compute Engine ID or CEID) 728 to indicate a portion of device functionality 504 that the memory may be configured to be accessed by. Additionally, or alternatively, the configure memory command 722 may include a Namespace ID (NSID) 726 to indicate a portion of device memory 506 to configure (e.g., a subset of the Namespace ID). Additionally, or alternatively, the configure memory command 722 may include a range ID (Range ID or RID) 727 to indicate a portion of device memory 506 to configure (e.g., a subset of the Namespace ID). Additionally, or alternatively, the configure memory command 722 may include a program identifier (Program ID, Prog ID or PID) 730 to indicate a specific program (e.g., run by one of the compute engines indicated by the Prog ID) that the memory may be configured to be accessed by.

FIG. 8 illustrates an embodiment of a device including a discovery mechanism and a management mechanism in accordance with example embodiments of the disclosure. The device 802 illustrated in FIG. 8 may include some elements similar to those illustrated in FIG. 1, FIG. 2, FIG. 3, and/or FIG. 5 in which similar elements may have reference numbers ending in similar digits. However, in the embodiment illustrated in FIG. 8, the controller 810 may include both discovery logic 814 and management logic 818. Moreover, in the embodiment illustrated in FIG. 8, one or more connections 832 between one or more portions of the device functionality 804 and one or more portions of the device memory 806 are illustrated. (The one or more connections 832 may also be referred to as a structure, an arrangement, or a fabric of connections).

The embodiment illustrated in FIG. 8 may also include a host 801 connected to the device 802 through a communication fabric 803. In some embodiments, the host 801 may send one or more tasks to the device 802 may perform the one or more tasks, for example, using at least one of the one or more portions of device functionality 804. In some embodiments, the host 801 may run one or more applications 805 that may utilize the one or more portions of device functionality 804.

The one or more connections 832 may be implemented using a wide variety of different conductors, interconnects, networks, interfaces, protocols, and/or the like. Examples may include wired connections using circuit board traces, buffers, line drivers, latches, repeaters, retimers, switches, multiplexers and/or demultiplexers, double data rate (DDR) interfaces of any generation (e.g., DDR2, DDR3, DDR4, DDR5, etc.), low-power DDR (LPDDR), Open Memory Interface (OMI), Common Flash Interface (CFI), Open NAND Flash Interface (ONFI), PCIe, NVMe, NVMe-oF, CXL, Gen-Z, OpenCAPI, CCIX, AXI, DMA, RDMA, ROCE, AMQP, Ethernet, TCP/IP, FibreChannel, InfiniBand, SATA, SCSI, SAS, iWARP, and/or the like.

Although the device functionality 804, the device memory 806, and the one or more connections 832 may be illustrated as separate elements, in some implementations, some or all of these elements may overlap. For example, in an embodiment in which at least a portion of device functionality 804 is implemented with an FPGA, at least some device memory (e.g., local memory in the FPGA) and at least a portion of a memory interconnect may be included within the FPGA. Moreover, although the one or more connections 832 may be illustrated as a single element, it may include one or more first connections between a first set of components and one or more second connections between a second set of components, wherein there may be no connections between the first set of components and the second set of components. For example, a first ASIC may include a first processor, a first local device memory, and a first connection between the first processor and the first local device memory, and a second ASIC may include a second processor, a second local device memory, and a second connection between the second processor and the second local device memory, however, there may be no connection between the first ASIC and the second ASIC.

In the embodiment illustrated in FIG. 8, one or more portions of the device memory 806 may be used, for example, for any of the operations described above with respect to FIG. 1, specifically: storing input data copied from a host, a storage medium (e.g., one or more portions of a storage medium configured as a storage namespace), and/or the like; buffering and/or output data for a program running on a compute engine; buffering intermediate data used by a program running on a compute engine; copying output data to host memory, a storage medium (e.g., one or more portions of a storage medium configured as a storage namespace), and/or the like; exchanging data between programs; exchanging data between virtual machines (e.g., running on one or more compute resources); and/or the like.

As further examples, one or more portions of the device memory 806 illustrated in FIG. 8 may be used for any number of the following purposes, operations, and/or the like: drive management (e.g., storing metadata and/or metadata lookup for usages such as key-value stores, file system information, cache management, and/or the like); copy buffers (e.g., intermediate buffers to copy data between namespaces), parity buffers (e.g., to store checksum or other data for redundancy operations such as a redundant array of independent drives (RAID)), temporary buffers (e.g., for one or more applications that may run, for example, at a host, at the device, and/or the like), command processing, translation and/or lookup buffers, checksum and/or encryption key buffers, and/or the like.

Examples of command processing may include processing NVMe command queues and/or entries (e.g., submission queues (SQs), submission queue entries (SQEs), completion queues (CQs), and/or completion queue entries (CQEs). For example, a control memory buffer (CMB) in an NVMe system may be implemented as a PCIe base address register (BAR) in memory mapped space that may be accessed (e.g., directly) by a host which may use a CMB for tasks such as such as placing SQEs in a buffer, enabling a device to place CQEs in a buffer, and/or the like. In some embodiments, device memory may be used for one or more functions of a CMB, for example, to process one or more commands at a device. Depending on the implementation details, this may provide improved utility, performance, and/or the like.

In an example embodiment using device memory for encryption keys in accordance with example embodiments of the disclosure, a host may pre-download a data structure of encryption keys into a device memory (e.g., for a key-per-IO (KPIO) implementation). With such an arrangement, the host may issue an IO and provide and a pointer to an index into the data structure to retrieve a corresponding encryption key for the IO which the device may use to encrypt and/or decrypt the IO. Depending on the implementation details, placing encryption keys in a buffer in device memory may protect the keys from exposure (e.g., to the host), for example, because a key may not be part of an IO command.

Figure 9:
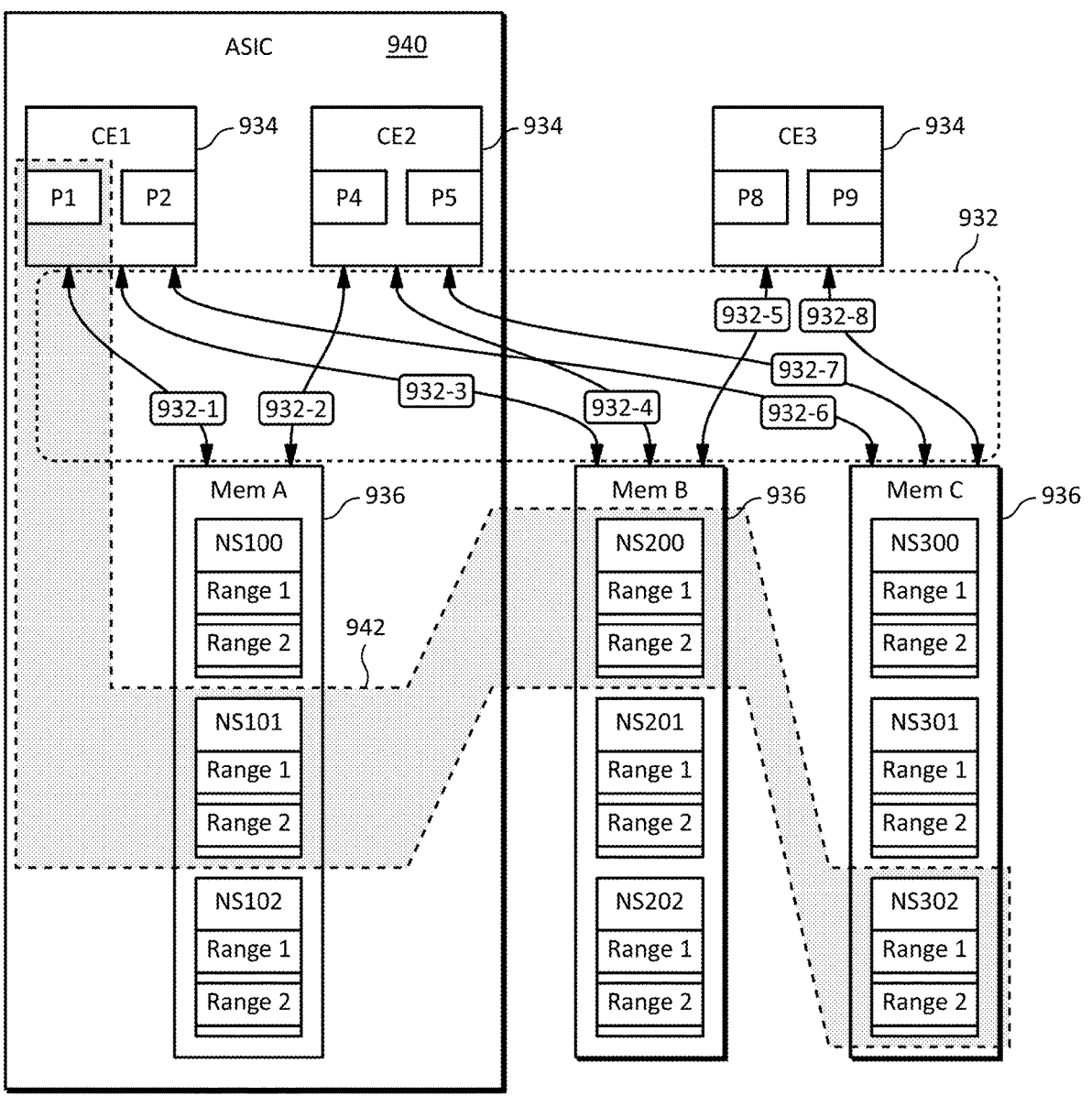
FIG. 9 illustrates an example embodiment of a device having device memory configured in accordance with example embodiments of the disclosure.

FIG. 9 illustrates an example embodiment of a device having device memory configured in accordance with example embodiments of the disclosure. The embodiment illustrated in FIG. 9 may be implemented with, or be used to implement, for example, the embodiments illustrated in FIG. 1, FIG. 3, FIG. 5, FIG. 8, and/or Table 1 in which similar elements may have reference numbers ending in similar digits. For purposes of illustration, the embodiment illustrated in FIG. 9 may be described in the context of device functionality apparatus implemented with compute engines, but the principles may be applied to any other types of device functionality.

Referring to FIG. 9, the device may include device functionality implemented with three compute engines 934 identified as CE1, CE2, and CE3, and device memory implemented with memory devices 936 identified as Mem A, Mem B, and Mem C. Compute engines CE1 and CE2 and memory device Mem A may be included in an ASIC 940. Compute engines CE1 and CE2 may be implemented, for example, with processors (e.g., ARM processors), gate arrays, logic devices, and/or the like, while compute engine CE3 may be implemented with a CPU.

Programs P1 and P2 may be instantiated, loaded, activated, and/or the like, on CE1. Programs P4 and P5 may be instantiated, loaded, activated, and/or the like, on CE2. Programs P8 and P9 may be instantiated, loaded, activated, and/or the like, on CE3.

Memory devices Mem A and Mem B may be implemented with volatile memory (e.g., DRAM), while memory device Mem C may be implemented with persistent memory. Some or all of memory device Mem A may be subdivided into (e.g., configured as) namespaces NS100, NS101, and/or NS102 which may be further subdivided into ranges Range 1 and Range 2. Some or all of memory device Mem B may be subdivided into (e.g., configured as) namespaces NS200, NS201, and/or NS202 which may be further subdivided into ranges Range 1 and Range 2. Some or all of memory device Mem C may be subdivided into (e.g., configured as) namespaces NS300, NS301, and/or NS302 which may be further subdivided into ranges Range 1 and Range 2. The number, type, characteristics, and/or the like, of the memory devices 936 illustrated in FIG. 9 are for purposes of illustration, and in other embodiments, memory devices with any other number, type, characteristics, and/or the like, may be used.

A connection structure 932 may include connections between the compute engines 934 and the memory devices 936. Specifically, Mem A may be connected to CE1 and CE2 by connections 932-1 and 9322, respectively. Mem B may be connected to CE1, CE2, and CE3 by connections 932-3, 932-4, and 932-5, respectively. Mem C may be connected to CE1, CE2, and CE3 by connections 932-6, 932-7, and 932-8, respectively. Because CE3 is external to the ASIC 940, there may be no connection between CE3 and Mem A.

Thus, CE1 and/or CE2 may be capable of accessing Mem A, Mem B, and/or Mem C, whereas CE3 may be capable of accessing Mem A and/or Mem B, but not Mem C.

In the example embodiment illustrated in FIG. 9, the following collection 942 of memory resources indicted may be configured (e.g., by management logic 518 in FIG. 5 and/or management logic 818 in FIG. 8) to be accessed by program P1 (as shown, for example, in Table 1): Range 1 and Range 2 of NS101 in Mem A, Range 1 and Range 2 of NS200 in Mem B, and/or Range 1 and Range 2 of NS 302 in Mem C. Thus, P1 may use any of the memory resources in collection 942 for program execution. In contrast, program P8 may not be able to access the memory resources in Mem A for program execution.

In some embodiments, and depending on the implementation details, a device having device memory and/or device functionality in accordance with example embodiments of the disclosure may implement any number of the following features and/or provide any number of the following benefits. Device memory (e.g., memory local to a device) may be made available for access to device functionality (e.g., one or more computational storage engines). One or more portions of device memory may be subdivided into one or more namespaces wherein a namespace may provide a virtual representation of one or more portions of device memory. An apparatus such as a host may be made aware of one or more portions of device memory, and/or one or more portions of device functionality that may be capable of accessing the one or more portions of device memory, for example using a discovery mechanism. In some embodiments, one or more portions of device memory may be partitioned into one or more groups (e.g., based on different memory characteristics). A device may implement a discovery mechanism that may enable the device to provide (e.g., to a host) information (memory information) about which group or groups of memory one or more portions of device functionality (e.g., compute engines) may be capable of accessing. One or more portions of device functionality (e.g., compute engines) may be capable of accessing one or more groups of memory, storage, and/or the like. One or more portions of device functionality (e.g., compute engines) may be capable of accessing one or more subdivided portions of one or more groups that the one or more portions of device functionality may be capable of accessing. An apparatus such as a host may use the memory information to indicate (e.g., using a list, table, or other data structure), of specific memory resources may be used by a program (e.g., running on a compute engine) for execution of the program.

In some embodiments, and depending on the implementation details, a device having device memory and/or device functionality in accordance with example embodiments of the disclosure may implement any number of the following features and/or provide any number of the following benefits. Device memory (e.g., memory that is local within a device) may be made available for private access to one or more compute engines and/or logic that may implement device functionality for other types of devices. Device memory (e.g., memory that is local within a device) may be made available for public access within a device, for example, to one or more (e.g., all) compute engines and/or logic that may implement device functionality for other types of devices. One or more types of memory may be differentiated by characteristics such as volatility, latency, power, and/or the like. Memory may be partitioned into one or more namespaces having access that may be managed, for example, by a host to one or more portions of specific device functionality based, for example, on access locality. A namespace may be subdivided into one or more sub-groups having one or more offsets (e.g., address ranges) that may be configured to be accessed by one or more programs to use for program execution. One or more of sub-groups may be grouped together to form a larger group, for example, for management of data flows by an apparatus such as a host. One or more portions of device functionality (e.g., compute engines) may be configured to access one or more memory namespaces and/or range groups. Any number of these features and/or benefits may be provided by a computational storage device in accordance with example embodiments of the disclosure.

In some embodiments, device memory may be implemented with various types of accessibility. For example, access to some portions of device memory may be restricted to specific portions of device functionality, whereas other portions of device memory may be accessible by any portions of device functionality. Thus, in some implementations, a memory management mechanism may configure some portions of device functionality and/or some portions of device memory for overlapping access. Additionally, or alternatively, a memory management mechanism may configure one or more portions of device memory for various types of accessibility.

In some embodiments, a memory management mechanism may configure one or more portions of device memory using a memory namespace. In some embodiments, a memory namespace may refer to a logical representation one or more portions of device memory. Thus, in some embodiments, a memory namespace may be implemented as a collection of one or more portions of device memory. Depending on the implementation details, memory namespaces may or may not include overlapping portions of memory. In some embodiments, one or more commands may be attached to one or more namespaces.

Figure 10:
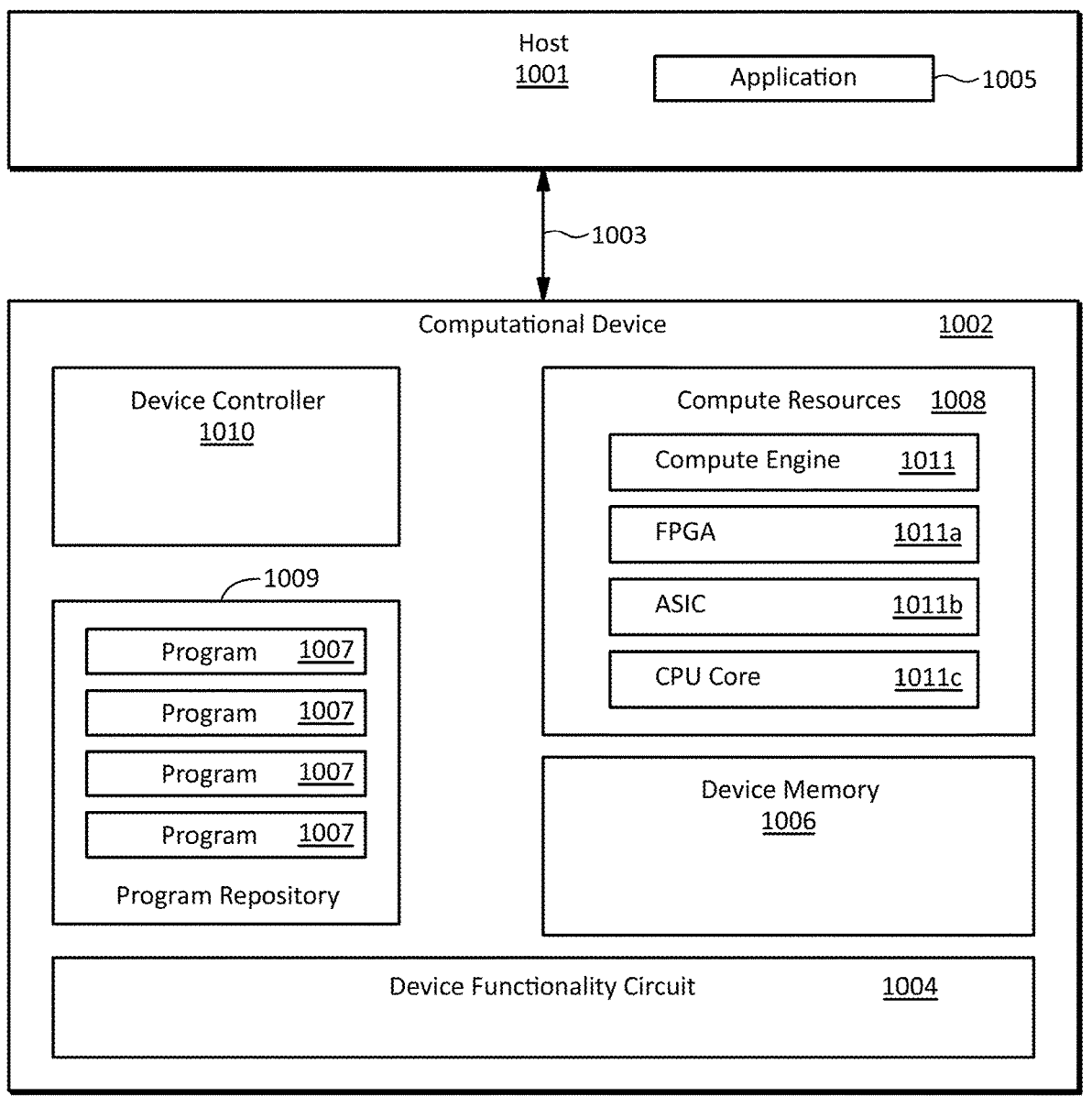
FIG. 10 illustrates an embodiment of a system including a computational device having compute and program resources in accordance with example embodiments of the disclosure.

FIG. 10 illustrates an embodiment of a system including a computational device having compute and program resources in accordance with example embodiments of the disclosure. The embodiment illustrated in FIG. 10 may include a host 1001, and a computational device 1002 connected by a communication fabric 1003.

The computational device 1002 may include a device controller 1010, a program repository 1009, a device memory 1006, one or more computational resources 1008 (which may also be referred to as compute resources), and/or a device functionality circuit 1004. The device controller 1010 may control the overall operation of the computational device 1002 including any of the operations, features, and/or the like, described herein. For example, in some embodiments, the device controller 1010 may parse, process, invoke, and/or the like, commands received from the host 1001. The device functionality circuit 1004 may include any hardware to implement the primary function of the computational device 1002. For example, if the computational device 1002 is implemented as a storage device, the device functionality circuit 1004 may include a storage medium such as one or more flash memory devices, a flash translation layer (FTL), and/or the like. In some embodiments, a computational storage device may be implemented as a computational storage drive (CSD), a computational storage processor (CSP), and/or a computational storage array (CSA).

As another example, if the computational device 1002 is implemented as a network interface card (NIC), the device functionality circuit 1004 may include one or more modems, network interfaces, physical layers (PHYs), medium access control layers (MACs), and/or the like. As a further example, if the computational device 1002 is implemented as an accelerator, the device functionality circuit 1004 may include one or more compute resources such as field programmable gate arrays (FPGAs), application specific integrated circuits (ASICs), embedded processors, and/or the like.

The host 1001 may be implemented with any component or combination of components that may utilize the compute resources 1008 of the computational device 1002. For example, the host 1001 may include to one or more of a client device, a server, a storage node, a central processing unit (CPU), a personal computer, a tablet computer, a smartphone, and/or the like. Moreover, the embodiment illustrated in FIG. 10 may include any number of hosts.

The communication fabric 1003 may be implemented with one or more interconnects, one or more networks, a network of networks (e.g., the internet), and/or the like, or a combination thereof, using any type of interface and/or protocol. For example, the fabric 1003 may be implemented with PCIe, NVMe, NVMe-oF, CXL, Gen-Z, OpenCAPI, CCIX, AXI, DMA, RDMA, ROCE, AMQP, Ethernet, TCP/IP, FibreChannel, InfiniBand, SATA, SCSI, SAS, iWARP, and/or the like, or any combination thereof. For example, in an embodiment in which the computational device 1002 is implemented as a storage device, the controller 1010 may implement a storage protocol such as NVMe, CXL, and/or the like, that may enable the host 1001 and the computational device 1002 to exchange commands, data, and/or the like, over the communication fabric 1003. In some embodiments, the communication fabric 1003 may include one or more switches, hubs, nodes, routers, and/or the like.

In some embodiments, one or more of the compute engines 1011 may include one or more processing resources such as CPLDs, FPGAs (shown as compute engines 1011a), ASICs (shown as compute engines 1011b), CPUs (e.g., CISC, RISC, and/or the like, or cores thereof shown as compute engines 1011c), GPUs, DPUs, NPUs, TPUs, and/or the like, that may execute instructions stored in any type of memory and/or implement any type of execution environment such as a container, a virtual machine, an operating system such as Linux, an Extended Berkeley Packet Filter (eBPF) environment, and/or the like, or a combination thereof. In some embodiments, a compute engine may include combinational logic, sequential logic, one or more timers, counters, registers, and/or state machines, and/or the like. In some embodiments, some or all of a compute resource may be implemented as a system-on-chip (SOC).

The program repository 1009 may include one or more program slots for storing one or more executable computational device programs 1007. In some embodiments, a computational device program (which may also be referred to as computational programs, compute programs, or, depending on the context, programs) may refer to any type of program that may be performed by one or more compute resources of a computational device such as an algorithm, data movement, data management, data selection, filtering, encryption and/or decryption, compression and/or decompression, checksum calculation, hash value calculation, cyclic redundancy check (CRC), and/or the like. In some embodiments, a computational device program may refer to a program that may be intended to be executed by a computational device, adapted to be executed by a computational device, and/or the like. In some embodiments, a compute engine may refer to a component or combination of components that may be capable of executing one or more computational device programs.

The one or more programs 1007 may be executed, for example, using one or more compute engines 1011 in the computational resources 1008. In some embodiments, the device memory 1006 may be used by one or more of the programs 1007 when being executed with one or more of the compute engines 1011. For example, the device memory 1006 may be used to hold input data, output data, transitional data, and/or the like, for one or more of the programs 1007.

In some embodiments, contexts, and/or the like, a program 1007 may be referred to as a function.

In some embodiments, the host 1001 may offload one or more tasks to the computational device 1002 which may perform the one or more tasks, for example, using one or more of the programs 1007 that may be executed by the compute resources 1008. For example, the host 1001 may run one or more applications 1005 that may utilize one or more of the programs 1007 and/or compute engines 1011 of the computational device 1002.

In some embodiments, one or more of the compute engines may provide full or partial (e.g., hybrid) hardware implementations of one or more of the programs 1007. For example, in some embodiments, one or more of the compute engines 1011 may include combinational logic, sequential logic, one or more timers, counters, registers, and/or state machines, one or more CPLDs, FPGAs, ASICs, and/or a combination thereof configured to process a bitstream for a program 1007 that may be implemented, for example, as a soft FPGA function.

Figure 11:
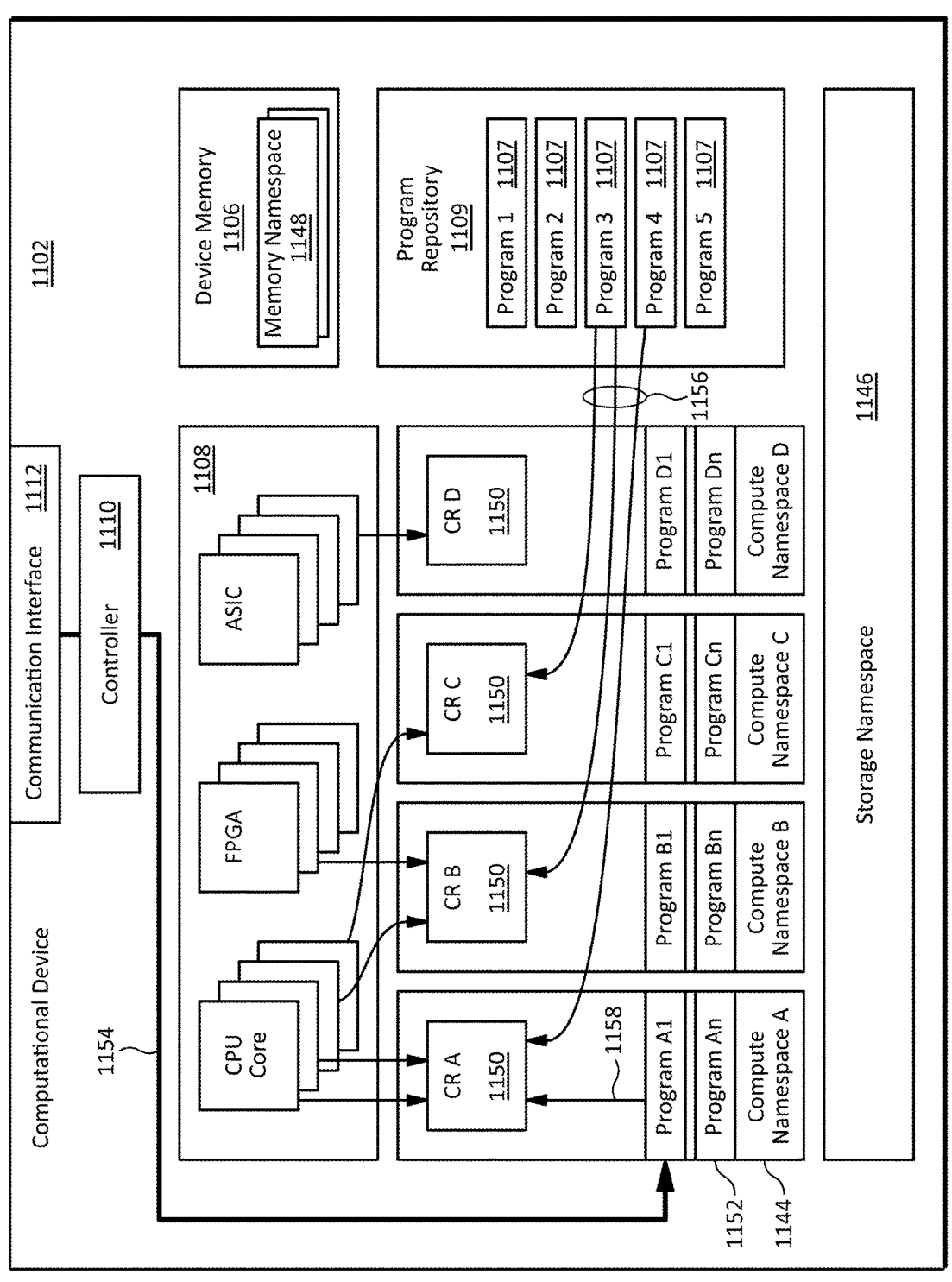
FIG. 11 illustrates an embodiment of a system including a computational device having loadable program resources in accordance with example embodiments of the disclosure.

FIG. 11 illustrates an embodiment of a system including a computational device having loadable program resources in accordance with example embodiments of the disclosure. The embodiment illustrated in FIG. 11 may include some elements that may be similar to those illustrated in FIG. 10 in which similar elements may have reference numbers ending in similar digits.

Referring to FIG. 11, in computational device 1102, one or more of the compute resources 1108 may be configured as, and/or accessed using, one or more compute namespaces 1144 identified as Compute Namespace A (CN A or CNS A), Compute Namespace B (CN B or CNS B), Compute Namespace C (CN C or CNS C), and/or Compute Namespace D (CN D or CNS D).

One or more of the compute namespaces 1144 may be configured to use compute resources 1150 (identified as CR A, CR B, CR C, and/or CR D) which may be mapped to a compute namespace 1144 from the compute resources 1108. For example, as shown by the arrows in FIG. 11, Compute Namespace A may be configured to use two CPU cores, Compute Namespace B may be configured to use one CPU core and one FPGA, Compute Namespace C may be configured to use one CPU core, and Compute Namespace D may be configured to use one ASIC. In some embodiments, the utilization of one or more of the compute resources 1108 may not be exclusive to a compute namespace. For example, a resource (e.g., an FPGA, an ASIC, a CPU core, and/or the like) mapped to a first compute namespace may be reused (e.g., mapped) to another compute namespace.

The computational device 1102 may include a program repository 1109 having one or more program slots for storing programs 1107 identified as Program 1, Program 2, Program 3, Program 4, and/or Program 5 that may be executed, for example, by one or more of the compute resources 1150 mapped to one or more of the compute namespaces 1144.

The programs 1107 may be placed in the program repository 1109 using various techniques. As a first example technique (which may be referred to as a built-in technique), a program 1107 may be built into the program repository 1109 by a vendor (e.g., a manufacturer, distributor, and/or the like) in the manner of an ASIC. As a second example technique (which may be referred to as a preload technique), a program 1107 may be preloaded in the program repository 1109 by a vendor, for example, when the device 1102 is manufactured, distributed, and/or the like.

As a third example technique (which may be referred to as a download technique), a program 1107 may be loaded (e.g., downloaded) into the program repository 1109 as part of a firmware installation and/or revision. For example, a device vendor may provide firmware content (e.g., a firmware image, file, and/or the like) that may include one more programs 1107 (e.g., all or part of a program repository 1109 including one or more programs 1107). The firmware content may be loaded (e.g., downloaded) into the program repository 1109 as part of a manufacturing process, a revision process (e.g., an update process, upgrade process, and/or the like), a distribution process, and/or the like. In some embodiments, firmware content may be loaded into the device 1102 (including loading one or more programs 1107 into the program repository 1109) using a vendor-specific mechanism. For example, firmware content may be loaded into the device 1102 using a download firmware command (e.g., an NVMe download firmware command) that may initiate a vendor-specific mechanism for loading firmware content into the device 1102. In some embodiments, such a mechanism may load a firmware image for the entire device 1102, and thus, it may be difficult or impossible to determine what portion of the firmware image may include one or more programs 1107 for the program repository 1109. Thus, a user (e.g., a host, an application, process, service, and/or the like) of the compute resources 1108 of device 1102 may not be able to load a program 1107 into the program repository 1109 using any of the first (built-in), second (preload), and/or third (download) example techniques described above. In some embodiments, vendor-specific mechanism for loading a program may decode a decode firmware package into device firmware and/or one or more computational programs for the device 1102.

A program 1107 loaded into the program repository 1109 using any of the first, second, and/or third example techniques described above may be referred to as a native program (or a fixed program or a preloaded program).

In some embodiments, using the third (download) technique to load a program 1107 into the program repository (e.g., downloading a firmware image, package, and/or the like to the device 1102) may provide one or more benefits similar to the second (preload) technique. However, depending on the implementation details, using the third (download) technique may involve placing the device 1102 and/or one or more executing programs into a quiescent state (e.g., a sleep state or turned off, shut down, paused, halted, hibernated, stopped, suspended, and/or the like). Moreover, depending on the implementation details, using the third (download) technique may involve: (1) restarting one or more virtual machines that have been assigned a compute namespace; (2) reloading (e.g., downloading) one or more previously downloaded programs 1107; and/or (3) completing, aborting, and/or the like, one or more computations that may be in progress (e.g., by one or more executing programs 1107).

The program repository 1109 may be implemented, for example, with volatile and/or nonvolatile memory, for example, as a portion of device memory 1106 and/or with memory that may be dedicated, at least partially, to the program repository 1109. In some embodiments, the program repository 1109 may be implemented, at least partially, virtually rather than as a physical entity. For example, one or more portions of the program repository 1109 may be implemented as a virtual instantiation of any memory implementation mechanism used throughout the device 1102 (e.g., using any scheme for memory virtualization, paging, mapping and/or the like).

A compute namespace 1144 may include one or more program slots that may be used to store programs 1152 that may be executed, for example, by one or more of the compute resources 1150 mapped to the corresponding compute namespace 1144. For example, Compute Namespace A may include one or more slots that may store programs Program A1, Program A2, . . . Program An; Compute Namespace B may include one or more slots that may store programs Program B1, Program B2, . . . Program Bn; and so forth.

In some embodiments, a program 1152 may be loaded (e.g., downloaded) to a namespace 1144 (e.g., by a user of the namespace such as an application, process, service, and/or the like) as shown by arrow 1154. A program 1152 loaded (e.g., downloaded) to, and/or stored in, a compute namespace 1144 may be referred to as a compute namespace program, a namespace program, or a local program. In some embodiments, a compute namespace program 1152 may be downloaded using a command referred to as a "load program to namespace command" (which may also be referred to as a load_program_to_namespace command or a load local program command). In some embodiments, a load local program command may be accessible, for example, using an application programming interface (API). In some embodiments, such an API may be implemented as part of a framework for computational devices, for example, using one or more NVMe commands. Depending on the implementation details, a virtual machine to which the compute namespace is mapped may control the downloading of a program to the compute namespace.

In some embodiments, a compute namespace 1144 may use one or more mapped compute resources 1150 to execute one or more programs 1107 from the program repository 1107 (as shown by arrows 1156) and/or one or more programs 1152 stored locally at the namespace 1144 (as shown by arrow 1158). In some embodiments, a compute namespace 1144 may use one or more portions of device memory 1106 (e.g., configured as one or more memory namespaces 1148) and/or one or more portions of storage media (e.g., implemented as part of device functionality and configured as one or more storage namespaces 1146).

In some embodiments, a compute namespace program 1152 may have a scope that may be limited to the compute namespace it may be downloaded to and/or stored in. (Such a scope may be referred to as a local or private scope.) In some embodiments, a program 1107 in a program repository 1109 may have scope that may extend to: the entire device 1102 (which may be referred to as a device-global scope); a subsystem (e.g., an NVMe subsystem) of the device 1102 (which may be referred to as a subsystem-global scope); and/or any other portions of the device 1102. Thus, in some embodiments, native programs 1107 in a program repository 1109 may have a device-global scope (which may also be referred to as device-public), a subsystem-global scope (which may also be referred to as subsystem-public), and/or the like.

In some embodiments, one or more native programs may not be overwritten and/or removed but may be disabled and/or not used. In some embodiments, one or more native programs may be overwritten (e.g., replaced), for example, by one or more loaded global programs.

In some embodiments, to be utilized, one or more programs (e.g., native programs 1107 and/or local programs 1152) may be associated with one or more compute namespaces 1144. An association may be created between a program and a namespace, for example, by activating a program (e.g., a native program 1107 and/or a local program

1152) within the namespace. In some embodiments, activating a program may enable the program may be scheduled for execution, for example, by an apparatus such as a host.

In some embodiments, one or more of the operations described herein with respect to FIG. 11 may be implemented, for example, using one or more commands (e.g., NVMe commands in the context of an NVMe framework and/or using an NVMe API) that may be received using the communication interface 1112 and/or processed by the controller 1110 (which may be implemented, at least partially, as an NVMe controller).

In some embodiments, a computational program framework (e.g., an NVMe framework) may type check a program 1152 that may be loaded to a namespace 1144. For example, a user may attempt to load a program 1152 to Namespace D. However, if the program 1152 indicates (e.g., advertises) that the program is of a type that is intended to operate with an CPU, the framework may prohibit (e.g., block) the program 1152 from being loaded to Namespace D because, in the embodiment illustrated in FIG. 11, Namespace D may not have a CPU mapped to the compute resources CR D, and thus, the program 1152 may not be supported by any compute engine in the compute resources CR D. In some embodiments, one or more program types may be implemented, defined, and/or the like, by a standard specification.

In contrast, in some embodiments, one or more programs 1107 in program repository 1109 may not indicate a program type, and/or may not be type checked, for example, because the type of compute resources 1150 that may be mapped to a namespace 1144 that may attempt to use the one or more programs 1107 may not be known (e.g., at the time the one or more programs 1107 is placed in the program repository 1109.)

Figure 12:
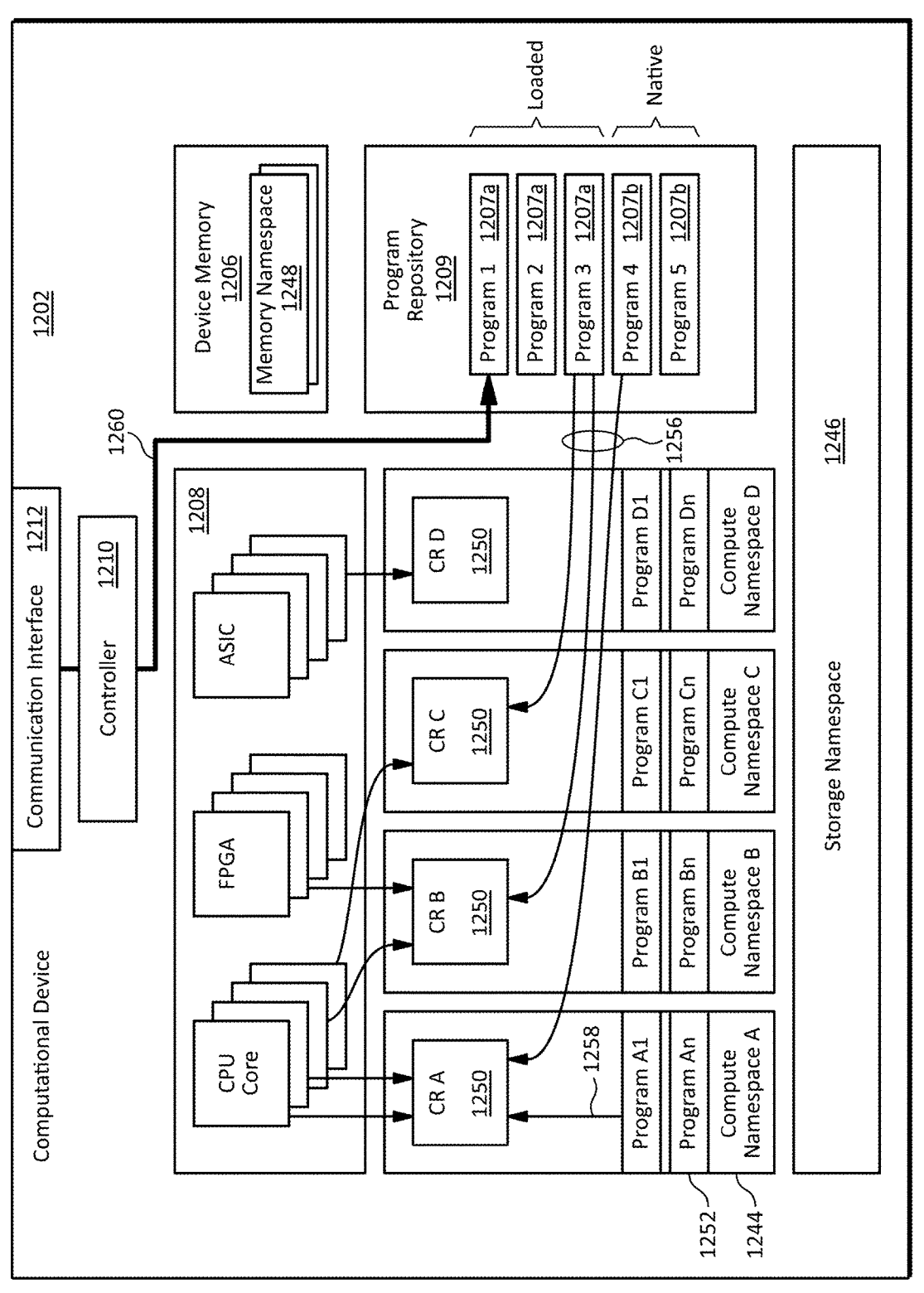
FIG. 12 illustrates an embodiment of a system including a computational device capable of loading program resources to a program repository in accordance with example embodiments of the disclosure.

FIG. 12 illustrates an embodiment of a system including a computational device capable of loading program resources to a program repository in accordance with example embodiments of the disclosure. The embodiment illustrated in FIG. 12 may include some elements that may be similar to those illustrated in FIG. 11 in which similar elements may have reference numbers ending in similar digits.

Referring to FIG. 12, a computational device 1202 may implement a program loading mechanism (which may be referred to as a global program loading mechanism) that may enable loading (e.g., downloading) one or more programs 1207a to a program repository 1209 as shown by arrow 1260. For example, a user (e.g., a host, an application, process, service, and/or the like) may load one or more programs 1207a to the program repository 1209 using a command referred to as a "load program to repository command" (which may also be referred to as a load global program command or a load_program_to_repository command). In some embodiments, a load global program command may be accessible, for example, using an API. In some embodiments, such an API may be implemented as part of a framework for computational devices, for example, using one or more NVMe commands.

Programs 1207a loaded (e.g., downloaded) to program repository 1209 may be referred to as loaded programs (or downloaded programs or loaded global programs), whereas programs 1207b placed in the program repository 1209 using any of the first (built-in), second (preload), and/or third (download) example techniques described above may be referred to as native programs (or fixed programs or preloaded programs).

In some embodiments, a specific loaded global program 1207a may not be visible in a specific compute namespace 1244 because the specific compute namespace 1244 may not have a compute engine that supports the specific loaded global program (as described above) mapped to it. For example an FPGA kernel program may not be visible in a compute namespace that only includes an ARM CPU compute resource.

In some embodiments, and depending on the implementation details, a global program loading mechanism in accordance with example embodiments of the disclosure may provide one or more benefits that may be similar, for example, to using a pre-built and/or preload technique, and/or may reduce or eliminate one or more potential problems associated with a download technique (e.g., the third example technique) as described above.

For example, a global program loading mechanism may enable one or more programs to be downloaded to a program repository 1209, for instance, to compensate for one or more programs that may not have been included (e.g., preloaded) at the time of manufacture and/or as part of a firmware update.

As another example, a global program loading mechanism in accordance with example embodiments of the disclosure may enable one or more loaded global programs to be accessible at a device global scope, a subsystem global scope, and/or the like. Thus, depending on the implementation details, a loaded global program may be accessed by more than one compute namespace, for example, within the same device, subsystem, and/or the like.

As a further example, a global program loading mechanism in accordance with example embodiments of the disclosure may exploit one or more existing program implementation techniques. For example, a loaded global program may be activated using an activation command that may be the same as, or similar to, an activation command used for a native program, a local program, and/or the like.

As yet another example, a loaded global program that has been loaded using a global program loading mechanism in accordance with example embodiments of the disclosure may not be subjected to type checking. Thus, in some embodiments, and depending on the implementation details, a loaded global program 1207a may be loaded (e.g., to a program repository 1209) regardless of whether any compute resources 1208 that may support the loaded global program 1207a that is to be loaded have been mapped to the compute resources 1250 in any compute namespace 1244, or even exist in the compute resources 1208. Therefore, depending on the implementation details, a loaded global program that has been loaded using a global program loading mechanism in accordance with example embodiments of the disclosure may appear to be the same as, or similar to, a built-in program and/or a preloaded program.

Moreover, a loaded global program that has been loaded using a global program loading mechanism in accordance with example embodiments of the disclosure may not indicate (e.g., advertise) a program type. Depending on the implementation details, this may further enable a loaded global program to avoid one or more type checking operations. This potential benefit may be especially advantageous, for example, to enable a custom program to be loaded as a loaded global program without disclosing how the custom program may be constructed, executed, and/or the like. Additionally, depending on the implementation details, a global program loading mechanism in accordance with example embodiments of the disclosure may enable and/or support a larger set of use cases and/or programs that may be offloaded to a device.

In some embodiments, and depending on the implementation details, a program that has been loaded into a program repository 1209 using a global program loading mechanism in accordance with example embodiments of the disclosure may behave in a manner that may be the same as, or similar to, a program has been placed in a program repository 1209 using the first (built-in) and/or second (preload) technique. Thus, a compute namespace 1244 may not be able differentiate between loaded global programs 1207a and native programs 1207b. In some embodiments, an apparatus such as a host may determine one or more programs (e.g., loaded global programs 1207a and/or native programs 1207b to activate, map, and/or the like, from a program repository 1209 to one or more compute namespaces 1244.

In some embodiments, a global program loading mechanism may enable a program to be loaded to a program repository 1209 without involving a reset at the level of a system, device, subsystem, and/or the like. Thus, depending on the implementation details, a global loaded program 1207a may be loaded to a program repository 1209 without involving the device 1202 and/or one or more executing programs into a quiescent state, without restarting one or more virtual machines that have been assigned a compute namespace, without reloading (e.g., downloading) one or more previously downloaded programs, and/or without completing, aborting, and/or the like, one or more computations that may be in progress.

In some embodiments, and depending on the implementation details, a global program loading mechanism in accordance with example embodiments of the disclosure may implement any number of the following features and/or provide any number of the following benefits. A program may be loaded (e.g., downloaded) to a program repository (e.g., a global repository) using a load program command (which may be implemented with administrative privileges). A load program command may be implemented to load a program to a program repository with subsystem level scope, a device level scope, and/or the like. A load program command may be implemented without a reset at a system, device, and/or subsystem level. One or more load program commands may be coordinated by a host, a virtual machine, and/or the like. The contents of a program repository may be discovered, for example, using a log page command. A loaded program may be instantiated in a compute namespace, for example, based on being activated in the compute namespace. A program loaded in a program repository may appear to be the same as, or similar to, a built-in program and/or a preloaded program which, depending on the implementation details, may enable to program to avoid type checking. One or more commands for loading a program into a program repository, discovering the contents of a program repository, activating a program, and/or the like, may be implemented using an API to a host, an application, process, service, and/or the like. Any number of the features and/or benefits disclosed herein may be implemented in the context of a computational storage device.

Any of the functionality disclosed herein, including, for example, any of the controllers, discovery logic, management logic, or any other functionality implemented at a host, a device, and/or the like, may be implemented with hardware, software, firmware, or any combination thereof including combinational logic, sequential logic, one or more timers, counters, registers, and/or state machines, one or more complex programmable logic devices CPLDs, FPGAs, ASICs, CPUs, GPUs, NPUs, TPUs, and/or the like, executing instructions stored in any type of memory, or any combination thereof. In some embodiments, one or more components may be implemented as a system-on-chip (SOC). In some embodiments, and depending on the context, the terms logic, circuit, device, and/or the like, may be used interchangeably.

Figure 13:
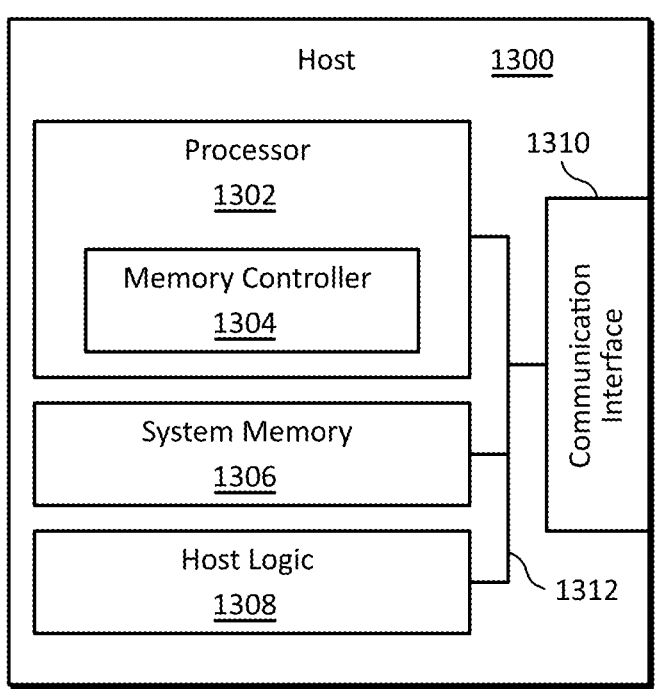
FIG. 13 illustrates an example embodiment of a host apparatus in accordance with example embodiments of the disclosure.

FIG. 13 illustrates an example embodiment of a host apparatus in accordance with example embodiments of the disclosure. The host apparatus illustrated in FIG. 13 may be used, for example, to implement any of the hosts disclosed herein. The host apparatus 1300 illustrated in FIG. 13 may include a processor 1302, which may include a memory controller 1304, a system memory 1306, host logic 1308, and/or a communication interface 1310. Any or all of the components illustrated in FIG. 13 may communicate through one or more system buses 1312. In some embodiments, one or more of the components illustrated in FIG. 13 may be implemented using other components. For example, in some embodiments, the host control logic 1308 may be implemented by the processor 1302 executing instructions stored in the system memory 1306 or other memory. In some embodiments, the host logic 1308 may implement any of the host functionality disclosed herein including, for example, running an application, sending commands to, and/or receiving responses from, a device, and availing the host 1300 and/or an application running thereon, of the device functionality as disclosed herein.

Figure 14:
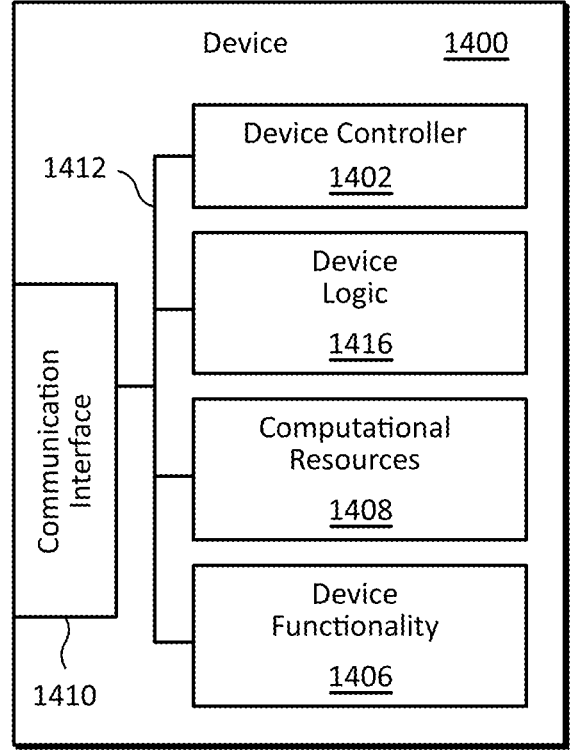
FIG. 14 illustrates an example embodiment of a device in accordance with example embodiments of the disclosure.

FIG. 14 illustrates an example embodiment of a device in accordance with example embodiments of the disclosure. The embodiment 1400 illustrated in FIG. 14 may be used, for example, to implement any of the devices disclosed herein. The device 1400 may include a device controller 1402, one or more computational resources 1408, device logic 1416, a device functionality circuit 1406, and a communication interface 1410. The components illustrated in FIG. 14 may communicate through one or more device buses 1412. The device logic 1416 may be used, for example, to implement any of the discovery logic, management logic, program download mechanisms, and/or the like, disclosed herein.

The device functionality circuit 1406 may include any hardware to implement the primary function of the device 1400. For example, if the device 1400 is implemented as a storage device, the device functionality circuit 1406 may include a storage medium such as one or more flash memory devices, an FTL, and/or the like. As another example, if the device 1400 is implemented as a network interface card (NIC), the device functionality circuit 1406 may include one or more modems, network interfaces, physical layers (PHYs), medium access control layers (MACs), and/or the like. As a further example, if the device 1400 is implemented as an accelerator, the device functionality circuit 1406 may include one or more accelerator circuits, memory circuits, and/or the like.

Figure 15:
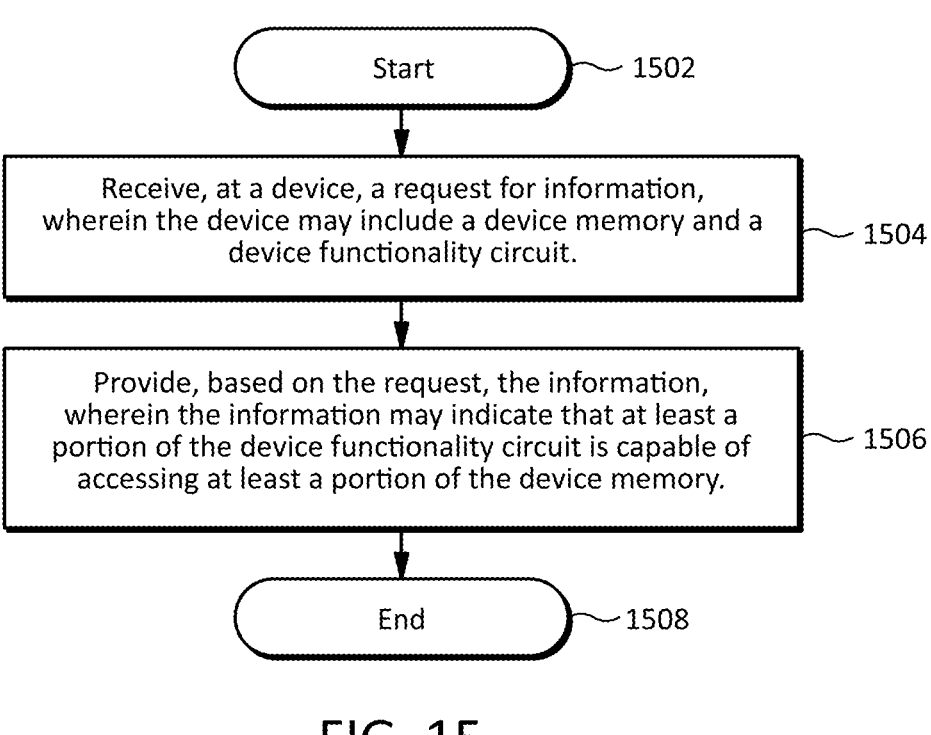
FIG. 15 illustrates an embodiment of a method for providing device memory information in accordance with example embodiments of the disclosure.

FIG. 15 illustrates an embodiment of a method for providing device memory information in accordance with example embodiments of the disclosure. The method may begin at operation 1502. At operation 1504, the method may receive, at a device, a request for information, wherein the device may include a device memory and a device functionality circuit. For example, the device functionality circuit may include apparatus to implement the device as a computational device, a storage device, a communication device, and/or the like as described above with respect to FIG. 3, FIG. 8, and/or FIG. 9. At operation 1506, the method may provide, based on the request, the information, wherein the information may indicate that at least a portion of the device functionality circuit is capable of accessing at least a portion of the device memory as described above with respect to FIG. 3, FIG. 8, and/or FIG. 9. For example, the information may indicate that an FPGA may be capable of accessing memory within the FPGA and/or memory external to the FPGA as described above with respect to FIG. 9. The method may end at operation 1508.

Figure 16:
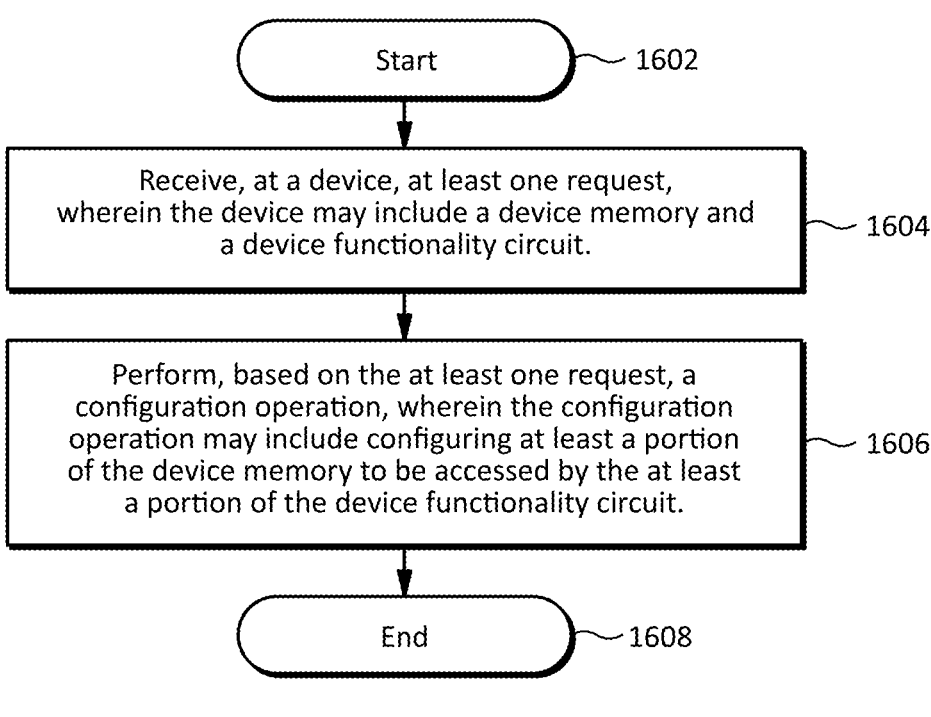
FIG. 16 illustrates an embodiment of a method for configuring device memory in accordance with example embodiments of the disclosure.

FIG. 16 illustrates an embodiment of a method for configuring device memory in accordance with example embodiments of the disclosure. The method may begin at operation 1602. At operation 1604, the method may receive, at a device, at least one request, wherein the device may include a device memory and a device functionality circuit. For example, the device functionality circuit may include apparatus to implement the device as a computational device, a storage device, a communication device, and/or the like as described above with respect to FIG. 3, FIG. 8, and/or FIG. 9. At operation 1606, the method may perform, based on the at least one request, a configuration operation, wherein the configuration operation may include configuring at least a portion of the device memory to be accessed by the at least a portion of the device functionality circuit. For example, the device may configure a portion of device memory to be accessed by a CPU by receiving configuration information (e.g., from an apparatus such as a host) and providing the configuration information to a memory controller of the CPU as described above with respect to FIG. 5. The method may end at operation 1608.

Figure 17:
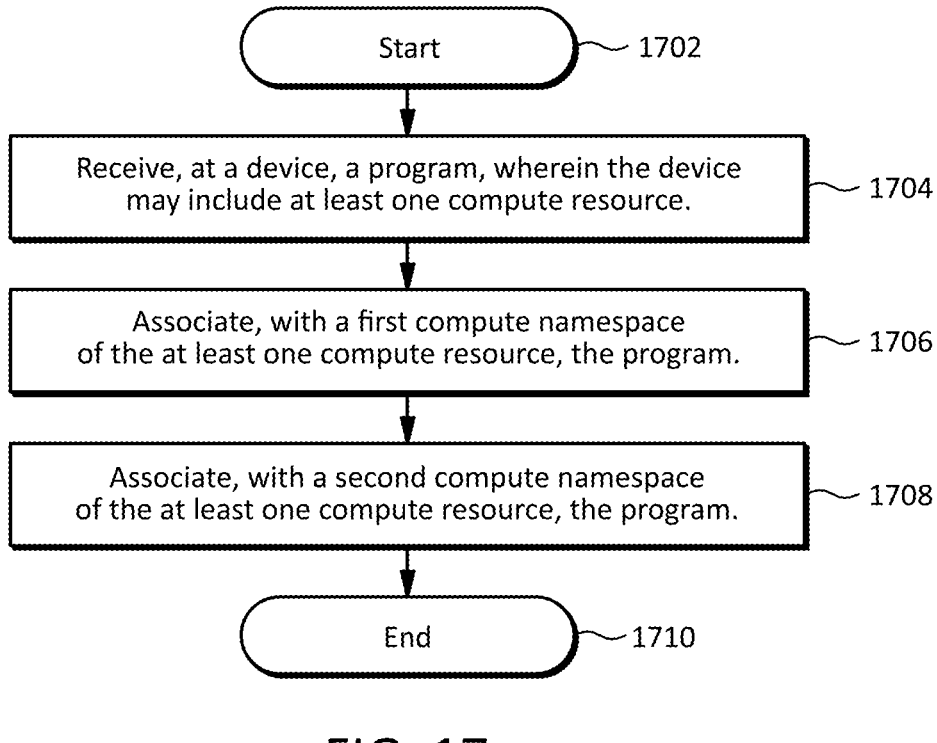
FIG. 17 illustrates an embodiment of a method for loading program resources to a device in accordance with example embodiments of the disclosure.

FIG. 17 illustrates an embodiment of a method for loading program resources to a device in accordance with example embodiments of the disclosure. The method may begin at operation 1702. At operation 1704, the method may receive, at a device, a program, wherein the device may include at least one compute resource. For example, The device may receive a loaded program 1207a at a program repository 1209, and the device may include at least one compute resource 1208 is illustrated in FIG. 12. At operation 1706, the method may associate, with a first compute namespace of the at least one compute resource, the program, and at operation 1708, the method may associate, with a second compute namespace of the at least one compute resource, the program. For example, first and second namespaces 1244 may be associated with a loaded program 1207a by activating the loaded program 1207a with the first and second namespaces 1244 as illustrated in FIG. 12. The method may end at operation 1708.

The embodiments illustrated in FIG. 13, FIG. 14, FIG. 15, FIG. 16, and/or FIG. 17, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

Although not limited to any specific applications, the inventive principles relating to management of device memory and/or programs disclosed herein may be especially beneficial when used with computational storage, which may be implemented, for example, with NVMe. With the addition of compute resources made available within the device, one or more compute operations may be offloaded from a host to a device where data used for one or more computations may reside. Depending on the implementation details, device in accordance with example embodiments of the disclosure may provide one or more benefits over models that may fetch the data, e.g., from the storage medium or network resource into host memory and then allow a CPU run compute operations on the fetched data (e.g., finding a count of zip codes that may have trending virus infections). Such a method may become, for example, because data may be transmitted across a fabric (e.g., a direct attached PCIe bus and/or network fabric which may increase latencies. Additionally, if multiple such arrangements are engaged, the total throughput may be lower per device than for a single device, for example, because a bus may not be able to avail the total performance provided by one or more devices (e.g., NVMe devices). Computational storage in accordance with example embodiments of the disclosure may enable one or more compute operations to be performed at or near storage, which, depending on the implementation details, may reduce transfer latencies. Moreover, only the results may be copied as opposed to source data which may be substantially larger in some use-cases. The inventive principles of this disclosure may provide one or more benefits, e.g., when used with computational storage devices which may implement compute resources with embedded CPUs, dedicated ASICs, FPGAs, GPUs, and/or the like.

Some embodiments disclosed above have been described in the context of various implementation details, but the principles of this disclosure are not limited to these or any other specific details. For example, some functionality has been described as being implemented by certain compo- nents, but in other embodiments, the functionality may be distributed between different systems and components in different locations and having various user interfaces. Cer- tain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to a block may refer to the entire block or one or more subblocks. The use of terms such as "first" and "second" in this disclosure and the claims may only be for purposes of distinguishing the elements they modify and may not indicate any spatial or temporal order unless apparent otherwise from context. In some embodiments, a reference to an element may refer to at least a portion of the element, for example, "based on" may refer to "based at least in part on," and/or the like. A reference to a first element may not imply the existence of a second element. The principles disclosed herein have independent utility and may be embodied individually, and not every embodiment may utilize every principle. How- ever, the principles may also be embodied in various com- binations, some of which may amplify the benefits of the individual principles in a synergistic manner. The various details and embodiments described above may be combined to produce additional embodiments according to the inven- tive principles of this patent disclosure.

Since the inventive principles of this patent disclosure may be modified in arrangement and detail without depart- ing from the inventive concepts, such changes and modifi- cations are considered to fall within the scope of the fol- lowing claims.

The invention claimed is:

1. A device comprising:
   a device memory; and
   a device functionality circuit, wherein at least a portion of the device functionality circuit is capable of accessing at least a portion of the device memory via a connection structure; and
   a control circuit configured to provide information about the device memory in response to a request sent from a host to the control circuit for the information, wherein the information indicates that the at least a portion of the device functionality circuit is capable of accessing the at least a portion of the device memory.

2. The device of claim 1, wherein the information further indicates a characteristic of the at least a portion of the device memory.

3. The device of claim 1, further comprising a commu- nication interface, wherein the control circuit is configured to provide the information using the communication inter- face.

4. The device of claim 3, wherein the control circuit is configured to:
   receive a request using the communication interface; and
   provide the information based on the request.

5. The device of claim 1, wherein the portion of device memory is a first portion of device memory, and wherein the information indicates that the at least a portion of the device functionality circuit is capable of accessing a second portion of the device memory.

6. The device of claim 1, wherein the portion of the device functionality circuit is a first portion of the device function- ality circuit, and wherein the information indicates that a second portion of the device functionality circuit is capable of accessing the at least a portion of the device memory.

7. The device of claim 1, wherein:
   a first portion of the at least a portion of the device functionality circuit is configured as a first namespace; and
   a second portion of the at least a portion of the device memory is configured as a second namespace.

8. A device comprising:
   a device memory; and
   a device functionality circuit, wherein at least a portion of the device functionality circuit is capable of accessing at least a portion of the device memory via a connection structure; and
   a control circuit configured to:
      receive at least one request sent from a host to the control circuit for a configuration operation; and
      perform, based on the at least one request, the configu- ration operation, wherein the configuration operation comprises configuring at least a portion of the device memory to be accessed by the at least a portion of the device functionality circuit.

9. The device of claim 8, wherein the configuration operation comprises:
   receiving configuration information; and
   providing the configuration information to a memory control apparatus associated with the at least a portion of the device functionality circuit.

10. The device of claim 8, wherein the configuration operation comprises allocating the at least a portion of the device memory to the at least a portion of the device functionality circuit.

11. The device of claim 8, further comprising a commu- nication interface, wherein the control circuit is configured to receive the request using the communication interface.

12. The device of claim 8, wherein the portion of device memory is a first portion of device memory, and wherein the control circuit is configured to configure, based on the at least one request, a second portion of the device memory to be accessed by the at least a portion of the device functionality circuit.

13. The device of claim 8, wherein the portion of the device functionality circuit is a first portion of the device functionality circuit, and wherein the control circuit is configured to configure, based on the at least one request, the at least a portion of the device memory to be accessed by a second portion of the device functionality circuit.

14. The device of claim 8, wherein:

a first portion of the at least a portion of the device functionality circuit is configured as a first namespace; and a second portion of the at least a portion of the device memory is configured as a second namespace.

15. The device of claim 8, wherein the portion of the device functionality circuit comprises:

a compute engine; and a program configured to use the compute engine.

16. A device comprising:

at least one compute resource;

a device memory configured as one or more memory namespaces; and a control circuit configured to:

receive a first program and a second program different from the first program;

map a first compute namespace to the at least one compute resource; and map a second compute namespace, different from the first compute namespace, to the at least one compute resource, wherein the at least one compute resource executes the first and second programs, and wherein at least one of the first compute namespace or the second compute namespace uses the one or more memory namespaces.

17. The device of claim 16, further comprising a communication interface, wherein the control circuit is configured to receive one of the first program and the second program using the communication interface.

18. The device of claim 17, wherein the control circuit is configured to provide, using the communication interface, information about one of the first program and the second program.

19. The device of claim 16, wherein the control circuit is configured to:

configure at least a first portion of the at least one compute resource as the first compute namespace; and configure at least a second portion of the at least one compute resource as the second compute namespace.

20. The device of claim 16, wherein the control circuit is configured to:

receive a command; and receive one of the first program and the second program based on the command.

* * * * *